United States Patent
Bridge et al.

(10) Patent No.: US 12,079,316 B2
(45) Date of Patent: Sep. 3, 2024

(54) SYSTEMS AND METHODS FOR COORDINATING SECURE DELIVERY OF GOODS

(71) Applicants: David Bridge, Mississauga (CA); Ruston Jeroen Hoffman, Grimsby (CA)

(72) Inventors: David Bridge, Mississauga (CA); Ruston Jeroen Hoffman, Grimsby (CA)

(*) Notice: Subject to any disclaimer, the term of this patent is extended or adjusted under 35 U.S.C. 154(b) by 208 days.

(21) Appl. No.: 17/798,926

(22) PCT Filed: Feb. 17, 2021

(86) PCT No.: PCT/CA2021/050169
§ 371 (c)(1),
(2) Date: Aug. 11, 2022

(87) PCT Pub. No.: WO2021/163791
PCT Pub. Date: Aug. 26, 2021

(65) Prior Publication Data
US 2023/0064053 A1    Mar. 2, 2023

Related U.S. Application Data

(60) Provisional application No. 62/979,548, filed on Feb. 21, 2020.

(51) Int. Cl.
*G06F 21/31*    (2013.01)
*G06Q 10/0832*    (2023.01)
(Continued)

(52) U.S. Cl.
CPC ......... *G06F 21/31* (2013.01); *G06Q 10/0832* (2013.01); *G06Q 10/0833* (2013.01); *G06Q 10/0834* (2013.01); *G06F 2221/2137* (2013.01)

(58) Field of Classification Search
CPC ............ G06F 21/31; G06F 2221/2137; G06Q 10/0832; G06Q 10/0833; G06Q 10/0834
See application file for complete search history.

(56) References Cited

U.S. PATENT DOCUMENTS 6,028,517 A    2/2000   Sansone et al.
6,323,782 B1   11/2001  Stephens et al.
(Continued)

OTHER PUBLICATIONS

International Preliminary Report on Patentability mailed Sep. 1, 2022 in related International Patent Application No. PCT/CA2021/050169 (6 pages).

*Primary Examiner* — Raqiul A Choudhury
(74) *Attorney, Agent, or Firm* — BERESKIN & PARR LLP/S.E.N.C.R.L., s.r.l.

(57) ABSTRACT

Systems and methods for coordinating secure delivery of goods. A coordination processor communicates with a package storage system and delivery provider device to deliver goods to a user. In response to a user ordering one or more goods, the coordination processor provides the delivery provider device with a delivery provider code usable to access a secure storage container at the package storage system. The coordination processor also provides the user with a first user code. Once the goods are positioned in the storage container, an alert is transmitted to the user device. The user can then input the first user code at the package storage system. In response to validating the first user code a second, different, user code can be transmitted to the user device. The user can input the second user code in order to access the secure storage container and retrieve the goods.

20 Claims, 9 Drawing Sheets

(51) Int. Cl.
*G06Q 10/0833* (2023.01)
*G06Q 10/0834* (2023.01)

(56) References Cited

U.S. PATENT DOCUMENTS

| | | |
|---|---|---|
| 6,690,997 B2 | 2/2004 | Rivalto |
| 6,791,450 B2 | 9/2004 | Gokcebay et al. |
| 9,861,221 B2 | 1/2018 | Jiang |
| 10,210,474 B2 | 2/2019 | Robinson et al. |
| 2002/0156645 A1 | 10/2002 | Hansen |
| 2005/0131774 A1 | 6/2005 | Huxter |
| 2014/0052661 A1 | 2/2014 | Shakes et al. |
| 2015/0046363 A1* | 2/2015 | McNamara ......... G06Q 10/0833 705/333 |
| 2017/0147974 A1* | 5/2017 | Pandey .............. G06Q 10/0833 |
| 2018/0131571 A1* | 5/2018 | Ansari ................... G06Q 30/04 |
| 2018/0232693 A1* | 8/2018 | Gillen ................ G06Q 10/0834 |
| 2019/0188730 A1* | 6/2019 | Smets .................... G06Q 30/06 |
| 2021/0216958 A1* | 7/2021 | Pacheco ............... H04L 9/3239 |

\* cited by examiner

SECUREDELVERY:

Registration

John Smith

123 Main St, Toronto, ON (416)-123-4567

January 1, 1982

Male

X12DS434323 johnsmith932

************

Submit

Already Registered?

Enter Username

Enter Password

Login

FIG. 6

SECUREDELIVERY:

http://securedelivery.com/registration

Shipping Address:

123 Main St

Toronto

ON

Choose your delivery option:
○ CourierX
○ Fast2Ship
● SecureDelivery

Submit

SYSTEMS AND METHODS FOR COORDINATING SECURE DELIVERY OF GOODS

FIELD

The described embodiments relate to systems and methods for delivering goods, and in particular to systems and methods for managing the delivery and retrieval of goods.

BACKGROUND

The following is not an admission that anything discussed below is part of the prior art or part of the common general knowledge of a person skilled in the art.

E-commerce platforms and online ordering systems continue to grow. These systems provide consumers with simple and convenient ways to purchase a wide assortment of goods. Consumers can access e-commerce platforms from almost anywhere to order goods for delivery. A crucial part of these e-commerce systems is the ability to effectively deliver the ordered goods to the ordering consumer.

Many e-commerce systems deliver goods directly to a consumer's doors. However, if the consumer is not home to receive the delivery, the goods may be left on the consumer's porch or front step. When the goods are left in a conspicuous location, there is a risk of a passerby simply stealing the goods before the consumer has a chance to retrieve them.

In some cases, deliveries may require the consumer to personally receive the goods. This may provide greater certainty that the consumer has actually received the ordered goods. However, if the consumer is not home to receive the delivery, the goods are often left at a nearby pick-up location, requiring the consumer to retrieve the goods from the pick-up location themselves. The pick-up locations often vary based on the particular delivery provider. Often, the pick-up location stores undelivered goods for multiple different consumers in the same storage space. This reduces the convenience of the online ordering system. This may also result in consumers inadvertently retrieving packages intended for other consumers.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In a broad aspect, there is provided a system for coordinating secure delivery of goods, the system comprising:
  a storage processor in communication with a package storage system, wherein the package storage system comprises a secure package container, and goods are receivable within the secure package container;
  a coordination processor in communication with the storage processor and a database, wherein the database is configured to store delivery provider data and storage system data, the delivery provider data identifying a plurality of potential delivery providers, and the storage system data identifying a plurality of potential package storage systems, and wherein the coordination processor is located remotely from the storage processor;
  wherein the coordination processor is configured to:
    receive a delivery request specifying at least one requested good for secure delivery and specifying a requesting user;
    determine, based on the delivery request, a preferred delivery provider for delivering the at least one requested good from amongst the plurality of potential delivery providers;
    determine, based on the delivery request, that the package storage system is a preferred package storage system for storing the at least one requested good from amongst the plurality of potential package storage systems;
    transmit a delivery provider authorization code to a delivery provider device associated with the preferred delivery provider; and
    transmit a first customer authorization code to a customer device associated with the requesting user;
  wherein the storage processor is configured to:
    receive a delivery provider drop-off request for the at least one requested good specifying a purported delivery provider authorization code;
    determine that the purported delivery provider authorization code corresponds to the delivery provider authorization code;
    in response to determining that the purported delivery provider authorization code corresponds to the delivery provider authorization code, permit access to the secure package container thereby allowing the preferred delivery provider to store the at least one requested good in the secure package container; and
    receive a first customer pick-up request for the at least one requested good specifying a purported first customer authorization code;
  wherein the coordination processor is further configured to:
    determine that the purported first customer authorization code corresponds to the first customer authorization code;
    in response to determining that the purported first customer authorization code corresponds to the first customer authorization code, transmit a second customer authorization code to the customer device associated with the requesting user;
  wherein the storage processor is further configured to:
    receive a second customer pick-up request for the same at least one requested good specifying a purported second customer authorization code;
    determine that the purported second customer authorization code corresponds to the second customer authorization code; and
    in response to determining that the purported second customer authorization code corresponds to the second customer authorization code, permit access to the secure package container by the requesting user thereby allowing the requesting user to retrieve the at least one requested good stored in the secure package container.

In some embodiments, the storage processor may be configured to determine that the purported delivery provider authorization code corresponds to the delivery provider authorization code by: transmitting the purported delivery provider authorization code to the coordination processor; and receiving a confirmation message indicating that the purported delivery provider authorization code corresponds to the delivery provider authorization code; and the coordination processor may be configured to: determine that the purported delivery provider authorization code corresponds to the delivery provider authorization code; and transmit the confirmation to the storage processor indicating that the purported delivery provider authorization code corresponds to the delivery provider authorization code.

In some embodiments, the first customer authorization code may be different from both the delivery provider authorization code and the second customer authorization code.

In some embodiments, the coordination processor may be configured to determine the preferred delivery provider by: determining at least one required delivery characteristic based at least on the at least one requested good; determining at least one delivery provider that satisfies the at least one required delivery characteristic from amongst the plurality of potential delivery providers; and selecting a particular delivery provider from the at least one delivery provider that satisfies the at least one required delivery characteristic as the preferred delivery provider.

In some embodiments, the coordination processor may be configured to select the delivery provider from the at least one delivery provider that satisfies the at least one required delivery characteristic as the preferred delivery provider by: transmitting potential delivery provider data corresponding to the at least one delivery provider that satisfies the at least one required delivery characteristic to the customer device associated with the requesting user; receiving, from the customer device associated with the requesting user, a selected delivery provider response identifying a selected delivery provider from the at least one delivery provider that satisfies the at least one required delivery characteristic; and selecting the selected delivery provider as the preferred delivery provider.

In some embodiments, the at least one required delivery characteristic can include a required security level; the database may be configured to securely store user data corresponding to the requesting user; and the coordination processor may be configured to: determine that the requesting user satisfies the required security level using the stored user data corresponding to that user; and transmit the first customer authorization code to the customer device associated with the requesting user only if the requesting user satisfies the required security level.

In some embodiments, the coordination processor may be configured to determine that the requesting user satisfies the security level by: transmitting the user data associated with the requesting user to an external authority system; and receiving a confirmation from the external authority system indicating that the requesting user satisfies the security level.

In some embodiments, the user data may specify at least one of: a name, an address, a telephone number, a date of birth, a gender, a social insurance number (SIN), passport number, a driver's license number, and a National Identification card.

In some embodiments, the storage processor may be configured to: determine a time limit for receiving the second customer pick-up request; determine that the second customer pick-up request was received within the time limit; permit access to the secure package container by the requesting user only in response to determining that the second customer pick-up request was received within the time limit.

In some embodiments, the storage processor may be configured to: in response to determining that the purported delivery provider authorization code corresponds to the delivery authorization code, transmit a delivery notification alert to at least one of the coordination processor, the customer device, and the delivery provider device.

In some embodiments, the package storage system may include at least one sensor configured to monitor goods stored within the secure package container; and the storage processor may be further configured to: receive sensor data from the at least one sensor; determine from the sensor data that a trigger condition is satisfied; and in response determining that the trigger condition is satisfied, transmit an alert to at least one of: the coordination processor, the customer device, and the delivery provider device.

In some embodiments, the trigger condition may include detecting access to the secure package container subsequent to permitting access to the secure package container in response to determining that the purported delivery provider authorization code corresponds to the delivery provider authorization code.

In some embodiments, the trigger condition may include detecting access to the secure package container subsequent to permitting access to the secure package container by the requesting user.

In some embodiments, the trigger condition may include detecting an attempted access to the secure package container by a third party.

In some embodiments, the at least one sensor may include a weight sensor; and the trigger condition may include determining that a weight of received goods within the secure package container differs from an expected weight of the at least one requested good.

In some embodiments, the at least one sensor may include a dimension sensor; and the trigger condition may include determining that a dimension of the received goods within the secure package container differs from an expected dimension of the at least one requested good.

In a broad aspect, there is provided a method for coordinating secure delivery of goods, the method comprising:
  operating a coordination processor to:
    receive a delivery request specifying at least one requested good for secure delivery and specifying a requesting user;
    determine, based on the delivery request, a preferred delivery provider for delivering the at least one requested good, from amongst a plurality of potential delivery providers identified by delivery provider data stored in a database in communication with the coordination processor;
    determine, based on the delivery request, a preferred package storage system for storing the at least one requested good from amongst a plurality of potential package storage systems identified by storage system data stored at the database, wherein the preferred package storage system comprises a secure package container, and goods are receivable within the secure package container;
    transmit a delivery provider authorization code to a delivery provider device associated with the preferred delivery provider; and
    transmit a first customer authorization code to a customer device associated with the requesting user;
  operating a storage processor in communication with the preferred package storage system to:
    receive a delivery provider drop-off request for the at least one requested good specifying a purported delivery provider authorization code;
    determine that the purported delivery provider authorization code corresponds to the delivery provider authorization code;
    in response to determining that the purported delivery provider authorization code corresponds to the delivery provider authorization code, permit access to the secure package container by the preferred delivery provider thereby allowing the preferred delivery provider to store the at least one requested good in the secure package container;
receive a first customer pick-up request for the at least one requested good specifying a purported first customer authorization code; and
further operating the coordination processor to:
determine that the first purported customer authorization code corresponds to the first customer authorization code;
in response to determining that the purported first customer authorization code corresponds to the first customer authorization code, transmit a second customer authorization code to the customer device associated with the requesting user;
further operating the storage processor to:
receive a second customer pick-up request for the same at least one requested good specifying a purported second customer authorization code;
determine that the purported second customer authorization code corresponds to the second customer authorization code; and
in response to determining that the purported second customer authorization code corresponds to the second customer authorization code, permit access to the secure package container by the requesting user thereby allowing the requesting user to retrieve the at least one requested good stored in the secure package container.

In some embodiments, the purported delivery provider authorization code may be determined to correspond to the delivery provider authorization code by: transmitting the purported delivery provider authorization code to the coordination processor; and receiving a confirmation message indicating that the purported delivery provider authorization code corresponds to the delivery provider authorization code; and the method may include operating the coordination processor to: determine that the purported delivery provider authorization code corresponds to the delivery provider authorization code; and transmit the confirmation to the storage processor indicating that the purported delivery provider authorization code matches the delivery provider authorization code.

In some embodiments, the first customer authorization code may be different from both the delivery provider authorization code and the second customer authorization code.

In some embodiments, the preferred delivery provider may be determined by: determining at least one required delivery characteristic based at least on the at least one requested good; determining at least one delivery provider that satisfies the at least one required delivery characteristic from amongst the plurality of potential delivery providers; and selecting a particular delivery provider from the at least one delivery provider that satisfies the at least one required delivery characteristic as the preferred delivery provider.

In some embodiments, the delivery provider may be selected from the at least one delivery provider that satisfies the at least one required delivery characteristic as the preferred delivery provider by: transmitting potential delivery provider data corresponding to the at least one delivery provider that satisfies the at least one required delivery characteristic to the customer device associated with the requesting user; receiving, from the customer device associated with the requesting user, a selected delivery provider response identifying a selected delivery provider from the at least one delivery provider that satisfies the at least one required delivery characteristic; and selecting the selected delivery provider as the preferred delivery provider.

In some embodiments, the at least one required delivery characteristic can include a required security level; and the method may include operating the coordination processor to determine whether the requesting user satisfies the required security level using user data corresponding to the requesting user stored at the database; where the first customer authorization code is transmitted to the customer device associated with the requesting user only if the requesting user satisfies the required security level.

In some embodiments, the requesting user may be determined to satisfy the security level by: transmitting the user data associated with the requesting user to an authority system; and receiving a confirmation from the authority system indicating that the requesting user satisfies the security level.

In some embodiments, the user data may specify at least one of: a name, an address, a telephone number, a date of birth, a gender, a social insurance number (SIN), passport number, a driver's license number, and a National Identification Card.

In some embodiments, the method may include operating the storage processor to: determine a time limit for receiving the second customer pick-up request;
determine that the second customer pick-up request was received within the time limit;
permit access to the secure package container by the requesting user only in response to determining that the second customer pick-up request was received within the time limit.

In some embodiments, the method may include operating the storage processor to, in response to determining that the purported delivery provider authorization code corresponds to the delivery authorization code, transmit a delivery notification alert to at least one of the coordination processor, the customer, and the delivery provider device.

In some embodiments, the method may include operating the storage processor to: receive sensor data from at least one sensor configured to monitor goods stored within the package storage container; determine from the sensor data, that a trigger condition is satisfied; and in response to determining that the trigger condition is satisfied, transmit an alert to at least one of: the delivery coordination system, the customer device, and the delivery provider device.

In some embodiments, the trigger condition may include detecting access to the secure package subsequent to permitting access to the secure package container in response to determining that the purported delivery provider authorization code corresponds to the delivery provider authorization code.

In some embodiments, the trigger condition may include detecting access to the secure package container subsequent to permitting access to the secure package container by the requesting user.

In some embodiments, the trigger condition may include detecting an attempted access to the secure package container by a third party.

In some embodiments, the trigger condition may include determining that a weight of received goods within the secure package container differs from an expected weight of the at least one requested good.

In some embodiments, the trigger condition may include determining that a dimension of received goods within the secure package container differs from an expected dimension of the at least one requested good.

In a broad aspect, there is provided a system for coordinating secure delivery of goods, the system comprising:

a database configured to securely store delivery provider data and storage system data, the delivery provider data identifying a plurality of potential delivery providers, and the storage system data identifying a plurality of potential package storage systems;

a coordination processor in communication with the database and a storage processor, wherein the storage processor is in communication with a package storage system, the package storage system comprises a secure package container, and goods are receivable within the secure package container, wherein the coordination processor is located remotely from storage processor;

wherein the coordination processor configured to:

receive a delivery request specifying at least one requested good for secure delivery and specifying a requesting user;

determine, based on the delivery request, a preferred delivery provider for delivering the at least one requested good from amongst the plurality of potential delivery providers;

determine, based on the delivery request, that the package storage system is a preferred package storage system for storing the at least one requested good from the plurality of potential package storage systems;

transmit a delivery provider authorization code to a delivery provider device associated with the preferred delivery provider;

transmit a first customer authorization code to a customer device associated with the requesting user;

receive a purported delivery provider authorization code from the storage processor;

determine that the purported delivery provider authorization code corresponds to the delivery provider authorization code;

in response to determining that the purported delivery provider authorization code corresponds to the delivery authorization code, instruct the storage processor to permit access to the secure package container by the preferred delivery provider thereby allowing the preferred delivery provider to store the at least one requested good in the secure package container;

receive a purported first customer authorization code from the storage processor;

determine that the purported first customer authorization code corresponds to the first customer authorization code;

in response to determining that the purported first customer authorization code corresponds to the first customer authorization code, transmit a second customer authorization code to the customer device associated with the requesting user;

receive a purported second customer authorization code from the storage processor; and determine that the purported second customer authorization code corresponds to the second customer authorization code; and in response to determining that the purported second customer authorization code corresponds to the second customer authorization code, instruct the storage processor to permit access to the secure package container by the requesting user thereby allowing the requesting user to retrieve the at least one requested good stored in the secure package container.

It will be appreciated by a person skilled in the art that a system, method or computer readable medium disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

A preferred embodiment of the present invention will now be described in detail with reference to the drawings, in which:

FIG. 6 illustrates an example user registration display in accordance with an example embodiment;

FIG. 7 illustrates an example delivery selection display in accordance with an example embodiment;

Figure 1:
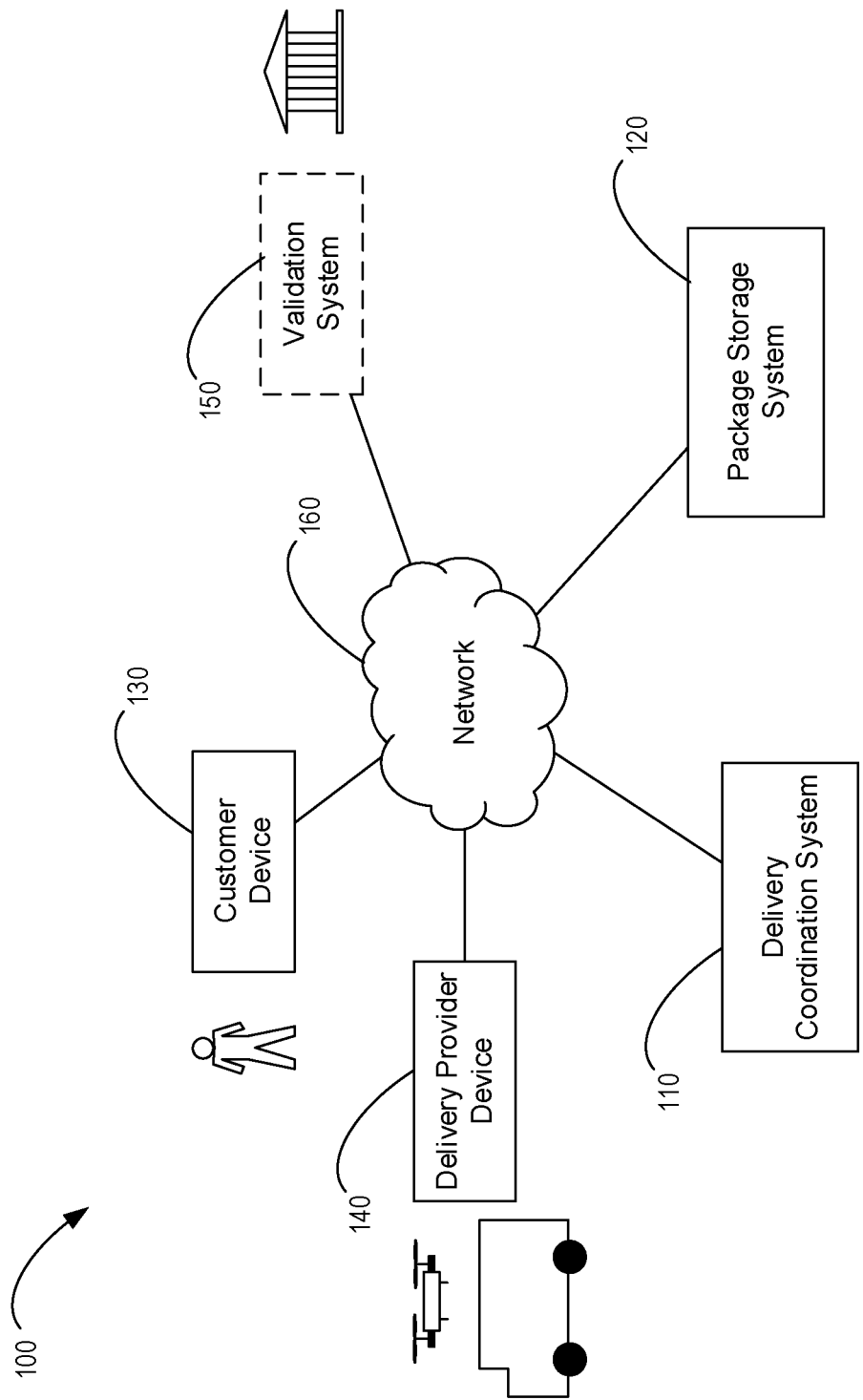
FIG. 1 is a block diagram of an example product delivery system in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXEMPLARY EMBODIMENTS

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

Referring now to FIG. 1, there is provided is a block diagram of a product delivery system 100 in accordance with an example embodiment. Product delivery system 100 is an example of a delivery system that can be used to monitor and coordinate the delivery of goods to users. Product delivery system 100 can be used to ensure reliable, secure and traceable delivery and retrieval of goods ordered online.

Product delivery system 100 generally comprises a plurality of computers connected via data communication network 160, which include various communication networks including the Internet. Network 160 may include networks be constructed from one or more computer network technologies, such as IEEE 802.3 (Ethernet), IEEE 802.11 and similar technologies. Network 160 may include multiple connected networks or virtual networks, which can be internetworked or isolated. These have been omitted for ease of illustration, however it will be understood that the teachings herein can be applied to such systems.

As shown in FIG. 1, the product delivery system 100 includes a delivery coordination system 110, one or more package storage systems 120, one or more customer devices 130, and one or more delivery provider devices 140 connected via network 160. Optionally, the product delivery system 100 may also include one or more authority or validation systems 150 connected via network 160.

Computers and computing devices may be connected to network 160 or a portion thereof via suitable network interfaces. Computing devices may also encompass any connected or "smart" devices capable of data communication, such as thermostats, televisions, speakers and the like. Increasingly, this encompasses a wide variety of devices as more devices become networked through the "Internet of Things".

Examples of computers include the delivery coordination system 110, which may be provided by a computer such as one or more desktop, laptop or server computers. Delivery coordination system 110 has a processor, volatile memory and non-volatile storage memory, and at least one network interface. Delivery coordination system 110 may include input devices such as a keyboard and trackpad, output devices such as a display and speakers, and various other input/output devices as will be appreciated. As with all devices shown in product delivery system 100, there may be multiple delivery coordination system computers 120, although not all are shown.

Similarly, the customer devices 130 can include various computing devices, such as smartphones, desktop, laptop or tablet computers, however the computing devices may also include a wide variety of "smart" devices capable of data communication. Like computer 110, the customer computing devices 130 have a processor, volatile and non-volatile memory, at least one network interface, and input/output devices. Each of the computers and computing devices may at times connect to external computers or servers via the Internet. In the description that follows, reference is made to a customer device 130 being associated with a user or requesting user. It should be understood that each user may have one or more associated customer devices 130.

Similarly, the delivery provider devices 140 can include various computing devices, such as smartphones, desktop, laptop or tablet computers, however the computing devices may also include a wide variety of "smart" devices capable of data communication. Like computer 110, the delivery provider computing devices 140 have a processor, volatile and non-volatile memory, at least one network interface, and input/output devices. Each of the computers and computing devices may at times connect to external computers or servers via the Internet. In the description that follows, reference is made to a delivery provider device 140 being associated with a delivery provider. It should be understood that each delivery provider may have one or more associated delivery provider devices 140.

Figure 3:
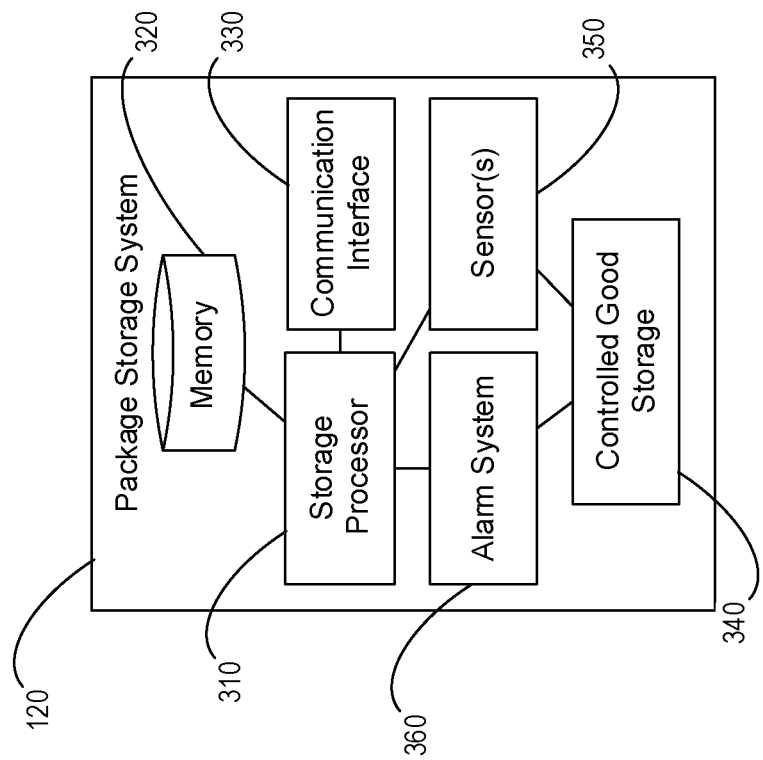
FIG. 3 is a block diagram of an example package storage system in accordance with an embodiment.

The package storage system 120 is configured to facilitate the delivery and retrieval of goods intended for a user. Package storage system 120 generally includes one or more storage containers. Each storage container can be configured to store goods for retrieval by a consumer. The package storage system 120 can also include various computing devices, such as smartphones, desktop, laptop or tablet computers, however the computing devices may also include a wide variety of "smart" devices capable of data communication. Like computer 110, the package storage system 120 can have a processor, volatile and non-volatile memory, at least one network interface, and input/output devices. An example package storage system 120 is shown in FIG. 3 and described in further detail herein below.

Delivery coordination system 110 may be configured to coordinate the process of delivering goods to a user. The delivery coordination system 110 can communicate with various other elements of system 100, such as the customer device 130, delivery provider device 140 and package storage system 120 to manage various aspects of the delivery process. In some examples, the delivery coordination system 110 can communicate with various external systems, such as an external validation system 150 or external e-commerce platform (not shown).

In general, the delivery coordination system 110 can store data related to the customer devices 130, delivery provider devices 140 and package storage systems 120 with which the delivery coordination system 110 communicates. This stored data can be used to manage various aspects of the delivery process.

For example, the delivery coordination system 110 can store delivery provider data identifying a plurality of potential delivery providers. Each potential delivery provider can be associated with one or more corresponding delivery provider devices 140. The delivery provider data can be used to identify potential delivery providers for each delivery and select a particular delivery provider for that delivery. For example, the delivery provider data may include potential delivery provider data associated with each potential delivery provider in the plurality of potential delivery providers. The potential delivery provider data can include data specific to that delivery provider, such as a delivery provider region. The delivery provider region may define a geographic region within which that delivery provider operates and is capable of providing deliveries. The delivery coordination system 110 can select a particular delivery provider based on the associated geographic region for that delivery provider and a requested delivery location.

The potential delivery provider data can also include delivery provider characteristics of the corresponding delivery provider. For example, the delivery provider characteristics may include a delivery provider refrigeration capability, and/or a delivery provider security level for example. The delivery provider refrigeration capability may specify whether the delivery provider is capable of refrigerating goods during delivery. The delivery provider security level may specify a security rating associated with that delivery provider, such as registrations or licenses required to deliver controlled goods.

The delivery coordination system 110 can store storage system data identifying a plurality of potential package storage systems 120. The storage system data can be used to identify potential package storage systems for each delivery and select a particular package storage systems for that delivery. For example, the storage system data can include a storage system location associated with each potential package storage system. The storage system location can identify a geographic location of the corresponding potential package storage system. The delivery coordination system 110 can select a package storage system for a delivery based on the storage system location for that package storage system and a requested delivery location.

The delivery coordination system 110 can store user data associated with users ordering goods. Each user may be associated with a corresponding customer device 130. The user data can be used to identify appropriate delivery providers and/or package storage systems 120 for deliveries to that user. For example, the user data can include one or more user delivery locations associated with a particular user. The delivery locations can be used to identify a geographic location for a requested delivery. In some cases, the delivery locations can include a requested delivery location for each particular delivery request.

The user data may also be used to evaluate a level of security required for a given delivery. For example, the user data can include a user security level associated with a particular user. The user security level may be used to identify corresponding package storage systems suitable for delivery to the requesting user.

The user data can also be used to ensure that the delivery is provided to an appropriate requesting user. For example, certain types of goods that may be requested for delivery (e.g. medications, alcohol, and other restricted goods) may require the receiving user to have certain characteristics (e.g. a required age, a prescription, an appropriate license etc.) in order to receive those goods. The user data can include user characteristics (e.g. demographic data) that can be used to evaluate whether the requesting user is permitted to receive and retrieve the requesting goods.

Figure 2:
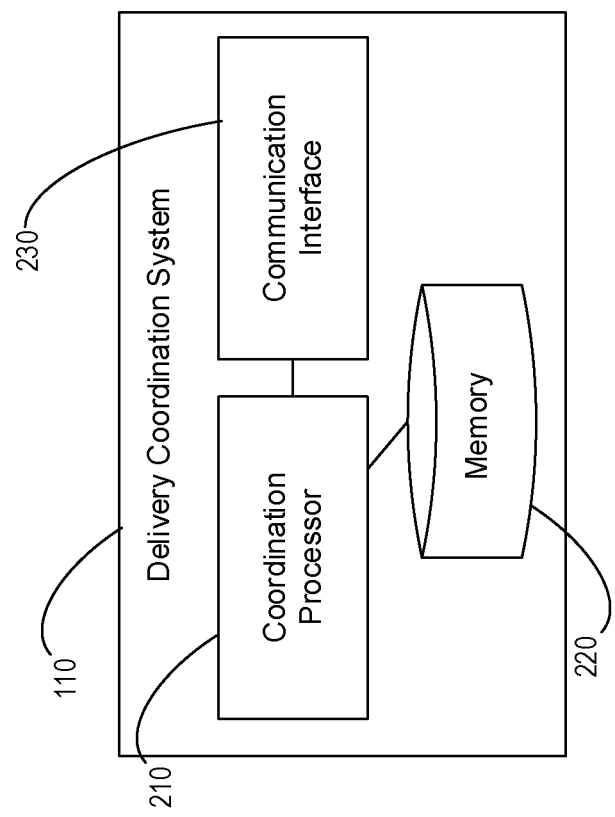
FIG. 2 is a block diagram of an example delivery coordination system in accordance with an embodiment.

An example delivery coordination system 110 is shown in FIG. 2 and described in further detail herein below.

As used herein, the term "software application" or "application" refers to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled.

A software application can be, for example, a monolithic software application, built in-house by the organization and possibly running on custom hardware; a set of interconnected modular subsystems running on similar or diverse hardware; a software-as-a-service application operated remotely by a third party; third party software running on outsourced infrastructure, etc. In some cases, a software application also may be less formal, or constructed in ad hoc fashion, such as a programmable spreadsheet document that has been modified to perform computations for the organization's needs. For example, for many organizations, important applications and services rely on regular input from spreadsheets that may be obtained from third parties, so these spreadsheets may be identified as software applications.

In embodiments described herein, the delivery coordination system 110 may be configured to provide an order delivery platform. The order delivery platform may be remotely accessible by computing devices, such as the customer device 130 and delivery provider device 140. The order delivery platform can be configured to coordinate and manage the delivery of goods to a user associated with a customer device 130 using a delivery provider associated with a delivery provider device 140 and a package storage system 120.

The order delivery platform may be provided in various forms. For example, the order delivery platform may be a webpage or web-based software application that can be accessed through a browser application operating on the computing device. Alternately, the order delivery platform may be accessed through a local delivery application operating locally on a computing device.

In some cases, the order delivery platform may be provided as a single platform accessible to both customer devices 130 and delivery provider devices 140. Alternately or in addition, the order delivery platform may include separate customer and delivery provider platforms. Alternately or in addition, the order delivery platform may provide separate functionality depending on whether it is accessed by a customer device 130 or delivery provider device 140. For instance, each user may have access credentials usable to access to order delivery platform. Each set of access credentials may be associated with certain functionality (e.g. identifying the user as a customer and/or delivery provider).

In some examples, the order delivery platform may provide a delivery initiation interface to a customer device 130. The delivery initiation interface may allow a user to initiate a delivery through the product delivery system 100. In some examples, the delivery initiation interface may include a product ordering interface. The product ordering interface may allow a user to select and purchase one or more goods. Alternately or in addition, the delivery initiation interface may be generated after a customer has purchased goods for delivery. For example, the customer may be directed to the delivery initiation interface from another e-commerce platform.

The order delivery platform can also provide various delivery coordination interfaces to the customer device 130 and/or delivery provider device 140. The delivery coordination interfaces can be used to coordinate the delivery of goods by a delivery provider associated with the delivery provider device 140. The delivery coordination interfaces may also be used to facilitate retrieval of delivered goods by a user associated with the customer device 130. Examples of various graphical user interfaces that may be presented by the order delivery platform are shown in FIGS. 5-10 and described in further detail herein below.

As noted above, the delivery coordination system 110 can be configured to communicate with a validation system 150. The validation system 150 may refer to an external authority system that may be managed by an oversight body, such as a governmental or other regulatory body. In some cases, the external authority system may be provided by a private oversight organization. The external authority system can be configured to authenticate data received by the delivery coordination system 110. For example, the validation system 150 can be configured to validate user data received from a customer device 130. The user data may be validated to ensure that a user requesting delivery of specified goods is permitted to receive those goods (e.g. that the user has the required security level and/or required user characteristics to receive the goods).

Referring now to FIG. 2, there is shown a block diagram of a delivery coordination system 110 in accordance with an example embodiment. The delivery coordination system 110 shown in FIG. 2 is an example of a delivery coordination system that can be used with the product delivery system 100 shown in FIG. 1.

As shown in FIG. 2, the delivery coordination system 110 can include a processor 210, memory 220 and communication interface 230. The delivery coordination system 110 may also include various additional components not shown in FIG. 2, such as one or more input devices (e.g. a mouse, keyboard, touchscreen etc.) and one or more output devices (e.g. a display, speakers etc.). The coordination processor 210 may be configurable using input devices and/or a computer remotely connected to the delivery coordination system 110, e.g. via communication interface 230.

Coordination processor 210 is a computer processor, such as a general purpose microprocessor. In some other cases, processor 210 may include a field programmable gate array, application specific integrated circuit, microcontroller, or other suitable computer processor. The delivery coordination system 110 may execute an operating system, such as Microsoft Windows™, GNU/Linux, or other suitable operating system.

Communication interface 230 can include one or more wired and/or wireless data communication interfaces. For example, communication interface 230 can include one or more data network interface, such as an IEEE 802.3 or IEEE 802.11 interface, for communication over a network. The coordination processor 210 may communicate with various other devices, such as a customer device 130, delivery provider device 140, and storage processor 310 via the communication interface 230.

The coordination processor 210 is coupled, via a computer data bus, to memory 220. Memory 220 may include both volatile and non-volatile memory. Non-volatile memory stores computer programs consisting of computer-executable instructions, which may be loaded into volatile memory for execution by processor 210 as needed. It will be understood by those of skill in the art that references herein to coordination processor 210 and/or delivery coordination system 110 as carrying out a function or acting in a particular way imply that processor 210 is executing instructions (e.g., a software program) stored in memory 220 and possibly transmitting or receiving inputs and outputs via one or more interface. Memory 220 may also store data input to, or output from, processor 210 in the course of executing the computer-executable instructions.

The memory 220 of the delivery coordination system 110 may store a software application referred to herein as a secure delivery platform or order delivery platform. The order delivery platform can be configured to coordinate and manage the delivery of goods to a user associated with a customer device 130 using a delivery provider associated with a delivery provider device 140 and a package storage system 120.

The order delivery platform can be configured to communicate with an order delivery application operating on the customer device 130, delivery provider device 140, and/or package storage system 120. The order delivery application may be a downloadable application, such as a mobile application, provided by the delivery coordination system 110. A user of the customer device 130 or delivery provider device 140 may download the order delivery application from the delivery coordination system 110 or through an app store such as the Apple App Store or Google Play. In other cases, the order delivery application may be a web-based application accessed by a user of the customer device 130 or delivery provider device 140, over a network such as the Internet.

Memory 220 may also store one or more databases. In some example embodiments, the databases may be relational database. In other embodiments, databases may be implemented using non-relational databases, such as a key-value database, NoSQL database, or the like. The database(s) can be used to store various types of data that can be accessed and used by the coordination processor 210 to manage and coordinate the delivery of goods.

The delivery coordination system 110 can be configured to store delivery provider data in the database. The coordination processor 210 can access and use the delivery provider data to select a particular delivery provider for a particular delivery of goods. The coordination processor 210 can then use the delivery provider data to identify and communicate with a corresponding delivery provider device 140

The delivery provider data can identify a plurality of potential delivery providers. For example, the delivery provider data may include potential delivery provider data associated with each potential delivery provider in the plurality of potential delivery providers. The potential delivery provider data can include data specific to that delivery provider, such as a delivery provider region and a delivery provider security level for example. In some cases, the potential delivery provider data may also include other provider specific data, such as associated costs, historical delivery data and so forth.

The delivery coordination system 110 can be configured to store storage system data in the database. The coordination processor 210 can access and use the storage system data to select a particular package storage system 120 for a particular delivery of goods. The coordination processor 210 can then use the delivery provider data to identify and communicate with the storage processor 310 of the selected package storage system 120. The coordination processor 210 can be located remotely from the storage processor 310, and may communicate with the storage processor via communication interface 230.

The storage system data can identify a plurality of potential package storage systems. For example, the storage system data may include potential package storage system data associated with each potential package storage system in the plurality of potential package storage systems. The potential package storage system data can include data specific to that package storage system, such as a storage system location.

The potential package storage system data can also include storage system characteristics of the corresponding package storage system. For example, the storage system characteristics may include a container capacity, a container refrigeration capability, and/or a storage system security level for example. The container capacity may identify the size of the container and/or the size of goods that can be positioned with each of the containers of the corresponding package storage system. The container refrigeration capability may specify whether one or more containers at the corresponding package storage system are capable of refrigerating goods during storage therein. The storage security level may specify the type(s) of anti-intrusion, anti-tampering, and/or alarm devices and/or systems are provided by the corresponding package storage system.

In some cases, the potential package storage system data may also include other storage system specific data, such as an associated storage cost, historical delivery data, storage container availability data and so forth.

The delivery coordination system 110 can be configured to store user data in the database. The coordination processor 210 can access and use the user data to select a particular package storage system 120 and/or delivery provider for a particular delivery of goods. The coordination processor 210 can use the user data to identify and communicate with the customer device 130 of the user requesting delivery of goods.

The user data stored by the database can include requesting user data for each user requesting delivery of goods. The requesting user data stored for each requesting user may vary based on the type of delivery transaction initiated by the user. For example, where the good(s) requested for delivery have limited value and require limited security (e.g. items that are not highly regulated and/or controlled such as clothing or towels), the delivery coordination system 110 may collect minimal requesting user data.

In some examples, the requesting user data may be limited to identifying data of a customer device 130 associated with the requesting user. Optionally, the delivery coordination system 110 may also collect a requesting user username usable to identify the user through a delivery coordination platform. The delivery coordination system 110 may also require the user to provide authentication data (e.g. an authentication code which may be provided in cleartext and/or hashed or otherwise obscured to increase security) usable to authenticate the requesting user.

In some cases, the delivery coordination system 110 may not collect any demographic data associated with the requesting user. This may further protect the privacy of the requesting user.

In some cases, the requesting user data may include additional data related to the requesting user. For example, where the good(s) requested for delivery are restricted in some sense (e.g. requiring the requesting user to be of a certain age, requiring the requesting user to have a prescription, requiring the requesting user to have a specified security level etc.) such as prescription medications, alcohol, designer clothes etc. the delivery coordination system 110 can be configured to collect additional requesting user data. The additional requesting user data can include user characteristics usable to evaluate whether the requesting user is permitted to receive the requested goods.

The requesting user data stored for the requesting user may include security related data usable to evaluate a security level associated with the requesting user. The security level may reflect the nature of goods that can be delivered to the requesting user. Where the requested good(s) are associated with a particular security level, the coordination processor 210 can use the requesting user data corresponding to the requesting user to determine whether or not the requesting user satisfies the required security level.

If the user does not satisfy the required security level, the coordination processor 210 can be configured to prevent the delivery from occurring (or at least prevent delivery through system 100). If the user satisfies the required security level, the coordination processor 210 can be configured to initiate and manage the requested delivery through system 100.

In some cases, the requesting user data can include user demographic data for the corresponding requesting user. For example, the user demographic data may include demographic data such as a requesting user age (or date of birth), a requesting user name, requesting user address, a requesting user phone number, a requesting user sex. In some cases, the requesting user data may also include user identification numbers, such as a social insurance number (SIN), social security number, national identification number and the like. The user identification numbers may also include other identification numbers, such as passport numbers, driver's license numbers and other identification data that can be verified with an external validation system 150.

The delivery coordination system 110 can also be configured to receive requested good data related to the goods requested by a consumer. In some cases, the delivery coordination system 110 can be configured to store requested good data in the database. Alternately or in addition, the delivery coordination system 110 may receive the requested good data in association with a user initiating a transaction for one or more goods.

In some cases, the coordination processor 210 can access and use the requested good data to select a particular package storage system 120 and/or delivery provider for a particular delivery of goods. In some cases, the coordination processor 210 can use the requested good data to determine whether the user requesting delivery of goods is permitted to receive the requested goods.

For example, the requested good data can include goods restrictions and/or required security levels associated with the requested good. The goods restrictions may relate to legal and/or regulatory restrictions of the purchase and delivery of the corresponding goods (e.g. a required age of the requesting user). The required security level may relate to security levels specified by a user and/or by a value of the requested good. The coordination processor 210 can use the goods restrictions and/or required security levels to identify suitable delivery providers and/or package storage systems 120 capable of handling the delivery of the requested goods.

The requested goods data may also include goods storage requirements and/or delivery deadlines associated with the requested goods. For example, the goods storage requirements may specify a level of refrigeration required for the requested goods (e.g. groceries and/or prescription medications). The delivery deadlines may specify a required delivery deadline for the requested goods (e.g. a short delivery timeline for perishable goods and/or urgently needed medications). The coordination processor 210 can use the goods storage requirements and/or delivery deadlines to identify suitable delivery providers and/or package storage systems 120 capable of handling the delivery of the requested goods.

In some cases, the requested goods data may also include required goods characteristics associated with the requested goods. For example, the requested goods may include goods that require the delivery provider to select the particular goods for delivery (e.g. particular grocery items). The required goods characteristics may specify a certain characteristics level (or suitable characteristic range) for the goods to be selected by the delivery provider. For example, where the requested goods include a perishable good, the required goods characteristics may specify a suitable expiry date or suitable expiry date range for the perishable good.

In some cases, the delivery provider may be required to provide validation data to validate that the delivery goods satisfy the required goods characteristics. In some cases, the delivery provider may input the validation data through the delivery coordination platform, e.g. by uploading a photograph or barcode scan of the good that is sufficient to establish the required goods characteristic. In some cases, the package storage system 120 may be configured to generate the validation data, e.g. by capturing an image and/or barcode scan of the good to validate that the particular good was delivered for the particular requesting user. This validation data can be provided to the coordination processor 210 to validate that the delivery was completed successfully. In some cases, the validation data may also be stored in the database. This may allow the coordination processor 210 to subsequently audit deliveries.

In general, data stored in the databases on memory 220 can be encrypted to prevent unauthorized access. Various types of encryption can be used to prevent unauthorized access to, and/or tampering with, the data stored in the databases. For example, file-based encryption may be used to individually encrypt data files stored on memory 220.

Additionally, communications between the delivery coordination system 110 and other devices (e.g. package storage system 120, customer devices 130, and/or delivery provider devices 140) may be encrypted or otherwise obscured to prevent unauthorized interception.

For example, various symmetric and/or asymmetric encryption techniques and standards may be used to encrypt data stored on the database and/or communications between components of the product delivery system 100. In some cases, a symmetric encryption technique such as the Advanced Encryption Standard (AES) may be used. For example, the AES 256 bit encryption algorithm may be used. Alternately, an asymmetric encryption technique such as the RSA standard may be used. In some cases, a combination of symmetric and asymmetric encryption techniques (e.g. a combination of AES & RSA) may be used to encrypt data stored on the database and/or communications between components of the product delivery system 100.

Referring now to FIG. 3, there is shown a block diagram of a package storage system 120 in accordance with an example embodiment. The package storage system 120 shown in FIG. 3 is an example of a delivery coordination system that can be used with the product delivery system 100 shown in FIG. 1.

As shown in FIG. 3, the package storage system 120 can include a storage processor 310, memory 320, communication interface 330, and one or more storage containers 340. The package storage system 120 may also include one or more sensors 350 and/or an alarm system 360 as shown in FIG. 2. The package storage system 120 may also include various additional components not shown in FIG. 3, such as one or more input devices (e.g. a keypad, keyboard, touchscreen, biometric scanner etc.) and one or more output devices (e.g. a display, light display, speakers etc.). The storage processor 310 may be configurable using input devices and/or a computer remotely connected to the package storage system 120, e.g. via communication interface 330.

Storage processor 310 is a computer processor, such as a general purpose microprocessor. In some other cases, processor 310 may include a field programmable gate array, application specific integrated circuit, microcontroller, or other suitable computer processor. The package storage system 120 may execute an operating system, such as Microsoft Windows™, GNU/Linux, or other suitable operating system.

Communication interface 330 can include one or more wired and/or wireless data communication interfaces. For example, communication interface 330 can include one or more data network interface, such as an IEEE 802.3 or IEEE 802.11 interface, for communication over a network. The communication interface 330 can also include various wireless network interfaces, such as Bluetooth, Wi-Fi or cellular communication interfaces. The coordination processor 310 may communicate with various other devices, such as a customer device 130, delivery provider device 140, and coordination processor 110 via the communication interface 330.

The storage processor 310 is coupled, via a computer data bus, to memory 320. Memory 320 may include both volatile and non-volatile memory. Non-volatile memory stores computer programs consisting of computer-executable instructions, which may be loaded into volatile memory for execution by processor 310 as needed. It will be understood by those of skill in the art that references herein to storage processor 310 and/or package storage system 120 as carrying out a function or acting in a particular way imply that processor 310 is executing instructions (e.g., a software program) stored in memory 320 and possibly transmitting or receiving inputs and outputs via one or more interface. Memory 320 may also store data input to, or output from, processor 310 in the course of executing the computer-executable instructions.

The memory 320 of the package storage system 120 may store a software application referred to herein as an order delivery application. The order delivery application can be configured to coordinate and manage access to the storage containers 340, e.g. via communication with coordination processor 210, customer devices 130 and delivery provider devices 140. The package storage system 120 can be positioned in a fixed location.

The package storage system 120 may be secured in location to prevent theft and or tampering. For example, the package storage system 120 may be implemented as a stationary locker, mailbox, dropbox, delivery box, etc. Alternatively, the package storage system 120 can be a mobile system which can be transported. For example, the package storage system 120 may be a portable storage system which can be delivered to a requesting user or picked up by a user from a third-party location. The package storage system 120 can be formed using various tamper-resistant materials (e.g., plastics, resins, composites, etc.). The package storage system 120 can include an alarm system 360 configured to alert the delivery coordination system 110 and/or an owner/manager of the package storage system 120 in response to detecting unauthorized access to a storage container 340 and/or other tampering with package storage system 120.

Package storage system 120 can be used to store goods for retrieval by a user associated with the customer device 130. The package storage system 120 can include one or more storage containers 340 usable to receive and store goods. The package storage system 120 can be configured to control access to the storage containers to ensure secure delivery and retrieval of goods. For example, storage processor 310 can be configured to manage access to the storage containers 340 by a delivery provider and/or user.

As shown in FIG. 3, package storage system 120 can include one or more storage compartments or chambers or containers 340. Each storage container 340 can be configured to receive one or more goods. A delivery provider can be provided with access to a given storage container 340 in order to deliver one or more goods intended for a particular consumer. The particular consumer may then subsequently be provided with access to the storage container 340 to retrieve the one or more goods.

Each storage container 340 can include an interior storage region or chamber within which goods can be received. The storage container 340 can be secured using various access control mechanisms (e.g. locks, anti-tampering devices, monitoring devices, alarm devices etc.) to prevent unauthorized access to the interior storage region (and the goods stored therein).

Optionally, a storage container 340 may be refrigerated and/or capable of refrigeration. This may allow the storage container 340 to store goods requiring refrigeration, such as certain perishable goods and/or medications. In some cases, a package storage system 120 may include one or more refrigerated (and/or capable of refrigeration) storage containers 340. In some cases, all the storage containers 340 at a particular package storage system 120 may be refrigerated and/or capable of refrigeration. In some cases, none of the storage containers 340 at a particular package storage system 120 may be refrigerated and/or capable of refrigeration.

In general, the package storage system 120 can include an access control system usable to manage the locking system for each the storage container 340. The package storage system 120 can include a storage processor 310. The storage processor 310 can be configured to manage access to the storage containers 340. The storage processor 310 can communicate with a coordination processor 210 of the delivery coordination system 110 to manage access to the storage container 340 by delivery providers and users. The storage processor 310 can provide a delivery provider associated with a delivery provider device 140 with access to a storage container 340 to deliver one or more goods. The storage processor 310 can subsequently provide a corresponding user with access to that storage container 340 to retrieve the delivered one or more goods.

The access control system can include one or more input devices provided by the package storage system 120. For example, the package storage system 120 can include a keypad or alphanumeric input device. Alternately or in addition, the package storage system 120 include an authorization code scanner, such as an optical or RF scanner. The input device may be usable by a delivery provider and/or user to input an authorization code to the package storage system 120. The storage processor 310 can be configured to authenticate the authorization codes prior to unlocking a corresponding storage container 340.

In some cases, the input device may also be configured to evaluate a package identifier associated with the delivered goods. For example, the input device may be a scanning configured to scan a barcode or UPC of the package being delivered.

In some cases, the package storage system 120 can include a plurality of storage containers 340. The storage processor 310 can be configured to manage access to each storage container 340 independently. For example, each storage container 340 can be secured using a different authentication code.

The storage processor 310 can also be configured to modify the authentication code associated with each storage container 340. For example, the storage processor 310 may modify the authentication code associated with a particular storage container 340 each time goods are delivered and retrieved from that storage container 340.

The storage processor 310 can be configured to monitor each of the storage containers 340. The storage processor 310 can be configured to monitor access to each of the storage containers (e.g. identifying the times of access to each storage container 340). Alternately or in addition, the storage processor 310 can be configured to identify trigger conditions indicating the presence and/or absence of goods within each storage container 340. Alternately or in addition, the storage processor 310 can be configured to monitor characteristics of the good(s) positioned within the storage container 340. The storage processor 310 may be configured to compare the characteristics of the goods with expected characteristics of goods requested for delivery to the corresponding storage container.

In some cases, the package storage system 120 can include one or more sensors 350. The sensor(s) 350 can be configured to monitor the storage containers 340. For instance, one or more sensors 350 can be configured to monitor goods positioned within each storage container 340. The sensors 350 can be configured to determine characteristics associated with each storage container 340 (e.g. empty, containing good(s), locked, unlocked etc.) and/or characteristics associated with goods received within each storage container 340 (e.g. weight, dimensions such as size and/or shape, delivery time, retrieval time, required goods characteristics etc.).

The storage processor 310 can receive sensor data from each sensor 350. The storage processor 310 can be configured to identify one or more trigger conditions based on the received sensor data. Trigger conditions may indicate conditions associated with a storage container 340 that trigger additional notifications to a user and/or the delivery coordination system 110. For example, the trigger conditions may include identifying the presence and/or absence of goods within a container 340, and/or determining that the characteristics associated with the goods in the container 340 correspond to, or are different from, the expected characteristics.

In some cases, the sensors 350 may include a weight sensor. The weight sensor can be configured to measure the weight of goods or a package positioned within a container 340. The storage processor 310 can be configured to determine that a trigger condition is satisfied by determining that a weight of received goods within the secure package container 340 differs from an expected weight of the at least one requested good. The storage processor 310 may then transmit an incorrect delivery notification to the delivery coordination system 110. Alternately, the storage processor 310 may transmit a valid delivery notification upon determining that the weight of received goods corresponds to the expected weight.

Various types of sensors 350 may be used to evaluate goods received within the storage containers 340. For example, optical dimensioning sensors, radar sensors, sonic sensors, ultrasonic sensors and other forms of proximity sensors may be used in various implementations of the package storage systems 120.

In some cases, the sensors may include one or more dimension sensors. Each dimension sensor can be configured to assess the dimensions of goods positioned within the storage container 340. The storage processor can be configured to determine that a trigger condition is satisfied by determining that a dimension of the received goods within the secure package container differs from an expected dimension of the at least one requested good. The storage processor 310 may then transmit an incorrect delivery notification to the delivery coordination system 110. Alternately, the storage processor 310 may transmit a valid delivery notification upon determining that the dimensions of received goods corresponds to the expected dimensions.

In some cases, the sensors may be configured to evaluate a required goods characteristic of one or more delivered goods. The storage processor can be configured to determine that a trigger condition is satisfied by determining that a characteristic of the received goods within the secure package container differs from a required goods characteristic of the at least one requested good. The storage processor 310 may then transmit an incorrect delivery notification to the delivery coordination system 110. Alternately, the storage processor 310 may transmit a valid delivery notification upon determining that the characteristics of received goods corresponds to the required goods characteristics.

In some cases, the sensors 350 may include one or more cameras. The cameras can be used to monitor the package storage system 120. In some cases, the sensors 350 may include a camera corresponding to each storage container 350. The camera may be positioned to capture images and/or video of the interior of the storage container 350. The camera can be configured to capture an image of goods positioned within the storage container 350. The storage processor 310 can be configured to analyze the captured images to determine whether the characteristics (e.g. shape and/or size) of the received goods corresponds to the expected characteristics.

In some cases, the camera can be activated based on a camera activation condition. For example, the camera may be activated following the storage processor 310 providing a delivery provider with access to the storage container 340. This may reduce the power required by the camera when the storage container 340 is not in use.

In some cases, the camera can capture an image of the delivered goods and the storage processor 310 can transmit the image to the requesting user via communication interface 330 (e.g. using local delivery application, an SMS message, e-mail etc.). In some cases, the camera may be used to capture validation data corresponding to the goods that were delivered. This can provide the consumer with evidence that the goods were properly delivered to package storage system 120.

In some cases, the camera may be configured to monitor the package storage system 120 to detect potential tampering and/or unauthorized attempts to access the storage container(s) 340. The storage processor 310 can be configured to monitor the images captured by the camera to identify potential tampering and/or unauthorized attempts to access the storage container(s) 340. The storage processor 310 may generate an alarm in response to detecting tampering and/or unauthorized access attempts. In some cases, the alarm may be emitted at the package storage system 120 using alarm system 360. For example, a visual or auditory alarm signal may be emitted. In some cases, the alarm may include an alert notification transmitted to the delivery coordination processor 110 via communication interface 330. The alarm may also communicate with external alarm networks, such as those provided by alarm system manufacturers.

The camera can also be configured to capture images associated with the potential tampering and/or unauthorized attempts to access the storage container(s) 340. For example, the camera can be configured to capture images of any persons associated with potential tampering and/or unauthorized attempts to access the storage container(s) 340. These images can be stored by memory 320 and/or transmitted to delivery coordination system 110 and/or external alarm systems. In some cases, the images can be transmitted directly to the customer device 130 and/or the delivery provider device 140.

In some cases, the sensors 350 may include one or more location sensors. For example, the sensors 350 may include one or more GPS receivers. The location sensors can be used to determine whether the package storage system 120 has been moved or relocated. In some cases, the location sensors may be used to determine if such relocation happened in an unauthorized manner. The location data can be stored by memory 320 and/or transmitted to delivery coordination system 110 and/or external alarm systems. In some cases, the location data can be transmitted directly to the customer device 130 and/or the delivery provider device 140.

Optionally, the package storage system 120 may include an energy storage member. The energy storage member may be usable to power the package storage system 120, e.g. in the absence of mains power. The energy storage member may be provided in various forms, such as one or more batteries and/or supercapacitors for example.

In some cases, the package storage system 120 can be installed in remote locations without direct access to mains power. The energy storage member may then provide the sole source of power for the package storage system. Alternately, the package storage system 120 can be connected to mains power. In such cases, an energy storage member may provide backup power in the event of a power outage of the mains power.

In some cases, the energy storage member may be rechargeable. For example, the energy storage member may be rechargeable using power from a mains power supply. Alternately or in addition, the package storage system may be configured to charge the energy storage member using solar energy.

Figure 4A:
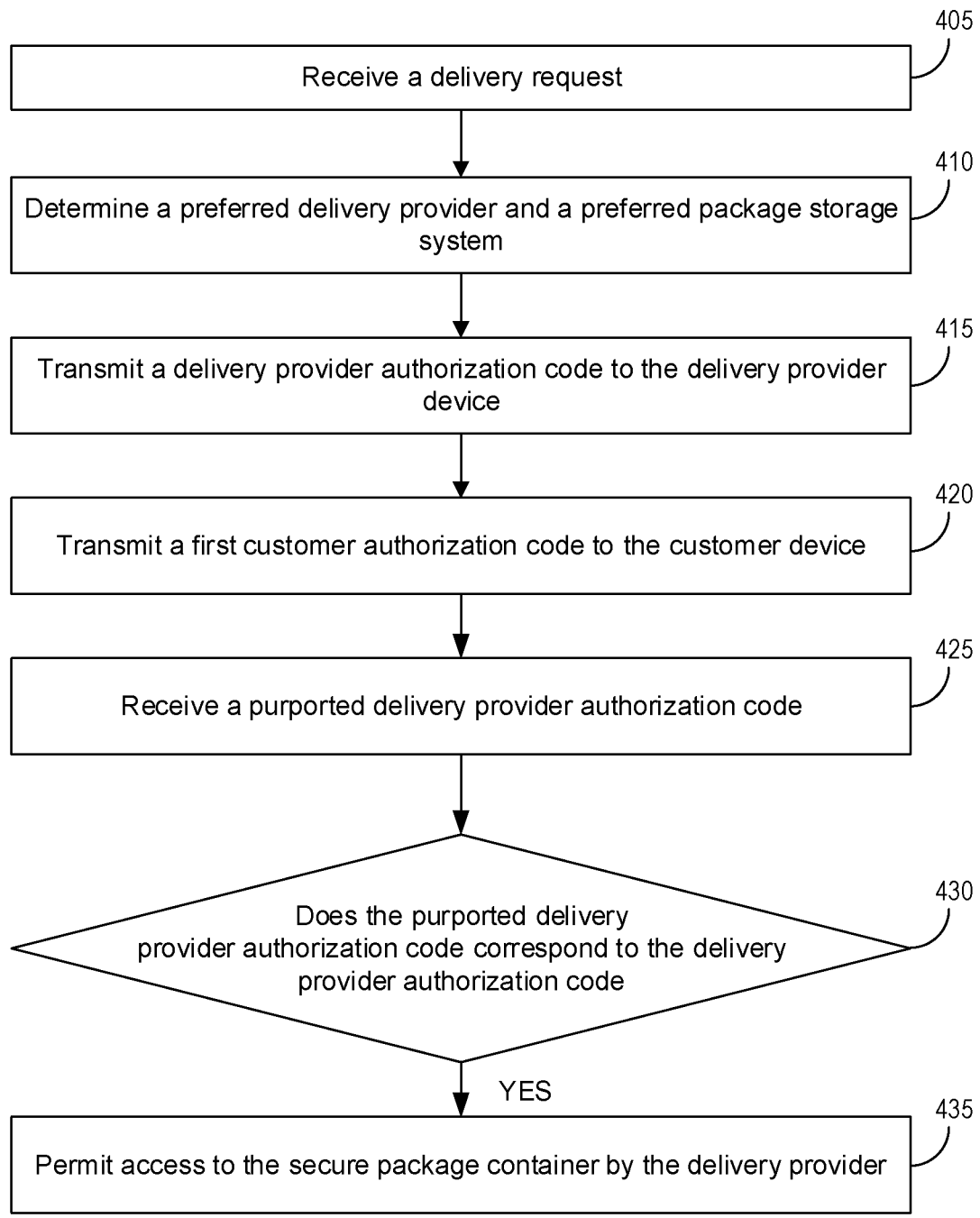
FIGS. 4A-4B are flowcharts illustrating an example method of coordinating secure delivery of goods in accordance with an example embodiment.
Figure 4B:
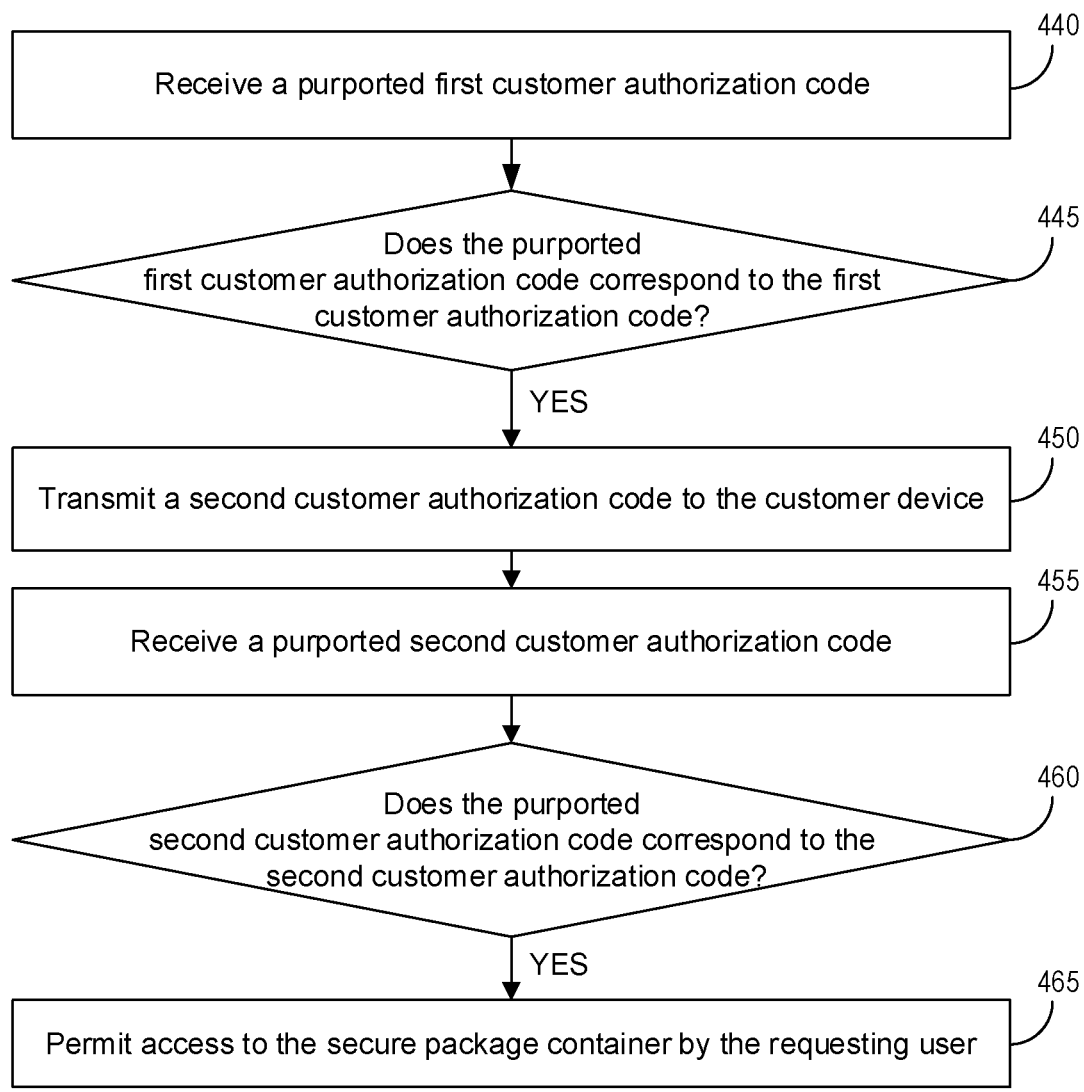

Referring now to FIG. 4, shown therein is a flowchart illustrating a method or process 400 of coordinating a delivery of goods. Method 400 may be carried out by various components of system 100, such as the delivery coordination system 110 and the package storage system 120.

Figure 5:
FIG. 5 illustrates an example delivery initiation display in accordance with an example embodiment.

At 405, the delivery coordination system 110 may receive a delivery request. The delivery request can identify one or more requested goods for secure delivery. For example, the delivery request may be generated at the completion of an e-commerce transaction. In some cases, a user may generate the delivery request by selecting a secure delivery option in a delivery initiation interface and/or delivery selection interface provided by the delivery coordination system 110. An example of a delivery initiation interface 500 is shown in FIG. 5 and described herein below. An example of a delivery selection interface 700 is shown in FIG. 7 and described herein below.

In some cases, the secure delivery request may be generated by default in an e-commerce platform. In some cases, the delivery request may be generated in response to the user selecting particular goods for purchase (e.g. controlled goods, goods having a high value, and/or goods requiring delivery confirmation from the requesting user).

The delivery request can also specify a requesting user requesting the delivery. For example, the requesting user may be identified in the delivery request. Alternately or in addition, the delivery request may be received from a customer device 130 associated with a user. The delivery coordination system 110 can then determine that the user associated with the customer device 130 is the requesting user.

The delivery coordination system 110 may use user data associated with the requesting user in order to initiate and coordinate delivery of the requested goods. For example, the delivery coordination system 110 may store user data in a database. This user data may then be accessed in response to determining that the requesting user corresponds to a user having user data already stored by the delivery coordination system. Alternately or in addition, delivery coordination system 110 may prompt the requesting user to provide user data to facilitate the delivery. For example, the delivery coordination system 110 may provide a user registration interface to allow the user to input user data. An example user registration interface 600 is shown in FIG. 6 described herein below.

At 410, the delivery coordination system 110 may determine a preferred delivery provider for the delivery request received at 405. The delivery coordination system 110 may also determine a preferred package storage system 120 for the delivery request received at 405.

The delivery coordination system 110 may select the preferred delivery provider from amongst a plurality of potential delivery providers. The delivery coordination system 110 can determine the preferred delivery provider based on the delivery request (e.g. based on user data included in, or otherwise associated with, the delivery request, and/or requested good data included in, or otherwise associated with, the delivery request). For example, the preferred delivery provider may be selected based on a delivery location associated with the delivery request. The preferred delivery provider may be selected as a suitable delivery provider for delivering the goods to the delivery location. The delivery coordination system 110 may also incorporate various other factors into determining the preferred delivery provider, such as delivery provider cost, availability, historical delivery provider data (e.g. data associated with previous deliveries), requested good data and so forth.

In some cases, the coordination processor 210 may determine at least one required delivery characteristic based on the at least one requested good. The required delivery characteristic can be based on various data associated with the requested good(s), such as requested goods data including goods restrictions, required security levels, goods storage requirements, delivery deadlines, required goods characteristics and so forth.

The coordination processor 210 may then determine at least one delivery provider that satisfies the at least one required delivery characteristic from amongst the plurality of potential delivery providers. The coordination processor may then select a particular delivery provider from the at least one delivery provider that satisfies the at least one required delivery characteristic as the preferred delivery provider.

For example, the at least one required delivery characteristic may include a required security level. The required security level may vary depending on the type and/or cost of the requested good. The coordination processor 210 may determine that the required security level is higher when the requested good has a high value. Alternately or in addition, the coordination processor may determine that the required security level is higher when the at least one requested good is controlled and/or regulated, thus requiring that the good is only delivered to users having the corresponding security level.

The coordination processor 210 may then determine at least one delivery provider that satisfies the security level from amongst the plurality of potential delivery providers. The coordination processor may then select a particular delivery provider from the at least one delivery provider that satisfies the security level as the preferred delivery provider.

In some cases, the coordination processor 210 may select the preferred delivery provider automatically. For example, the coordination processor 210 may select the preferred delivery provider based on the required delivery region of the requested good and the at least one required delivery characteristic (if any). The coordination processor 210 may also implement various other delivery provider selection rules, for example using historical delivery provider data (e.g. delivery success rates, ratings) and/or delivery provider cost data.

In some cases, the coordination processor 210 may select the preferred delivery provider in response to a user request. The coordination processor 210 can be configured to transmit potential delivery provider data corresponding to the at least one potential delivery provider to the customer device 130 associated with the requesting user. For example, the coordination processor 210 can be configured to transmit potential delivery provider data from each potential delivery provider that satisfies the at least one required delivery characteristic. The coordination processor 210 may then receive a selected delivery provider response from the customer device 130 associated with the requesting user. The selected delivery provider response can identify a selected delivery provider from the at least one delivery provider identified by the coordination processor 210. The coordination processor 210 can then select the selected delivery provider as the preferred delivery provider.

The coordination processor 210 can also be configured to determine, based on the delivery request, that the package storage system 120 is a preferred package storage system 120 for storing the at least one requested good from amongst a plurality of potential package storage systems. For example, the package storage system 120 may be associated with the requesting user. In some cases, the delivery request may specify a requested delivery location.

The coordination processor 210 may then identify the plurality of potential package storage system 120 as the package storage systems within a defined radius of the requested delivery location. The coordination processor 210 can be configured to select the preferred package storage system 120 based on the proximity of each package storage system to the requested delivery location. For example, the closest package storage system may be selected as the preferred package storage system 120.

In some cases, the coordination processor 210 may also factor in other characteristics into determining the preferred package storage system 120. For example, each package storage system 120 may have an associated level of availability. The level of availability may indicate the number of storage containers 340 available for delivery at the corresponding package storage system 120. In some cases, the coordination processor 210 may select the preferred package storage 120 as the nearest package storage system 120 having sufficient availability for the requested delivery. Optionally, the coordination processor 210 may select the preferred package storage system 120 for a plurality of requested deliveries in order to improve the relative availability within each package storage system 120. This may facilitate more rapid deliveries for a greater number of requesting users.

In some cases, the coordination processor 210 may identify the plurality of potential package storage system 120 using at least one required delivery characteristic of the at least one requested good. The process of identifying potential package storage systems based on at least one required delivery characteristic can proceed in a manner similar to the selection of potential delivery providers described herein above.

At 415, the delivery coordination system 110 may transmit a delivery provider authorization code to a delivery provider device 140 associated with the preferred delivery provider determined at 410. The delivery provider authorization code may be usable by a user of the delivery provider device 140 to access a particular storage container 340 of the preferred package storage system 120.

The delivery coordination system 110 may also transmit storage system location data to the delivery provider device 140. The storage system location data may indicate a location of the preferred package storage system. The storage system location data may also indicate a particular storage container 340 to be accessed by the delivery provider associated with the delivery provider device 140. In some cases, the storage container 340 may be pre-selected for the particular delivery. Alternately, the storage container 340 may be determined by the storage processor 310 on an ad-hoc basis, e.g. based on storage container availability at the time the delivery provider completes delivery.

Figure 8:
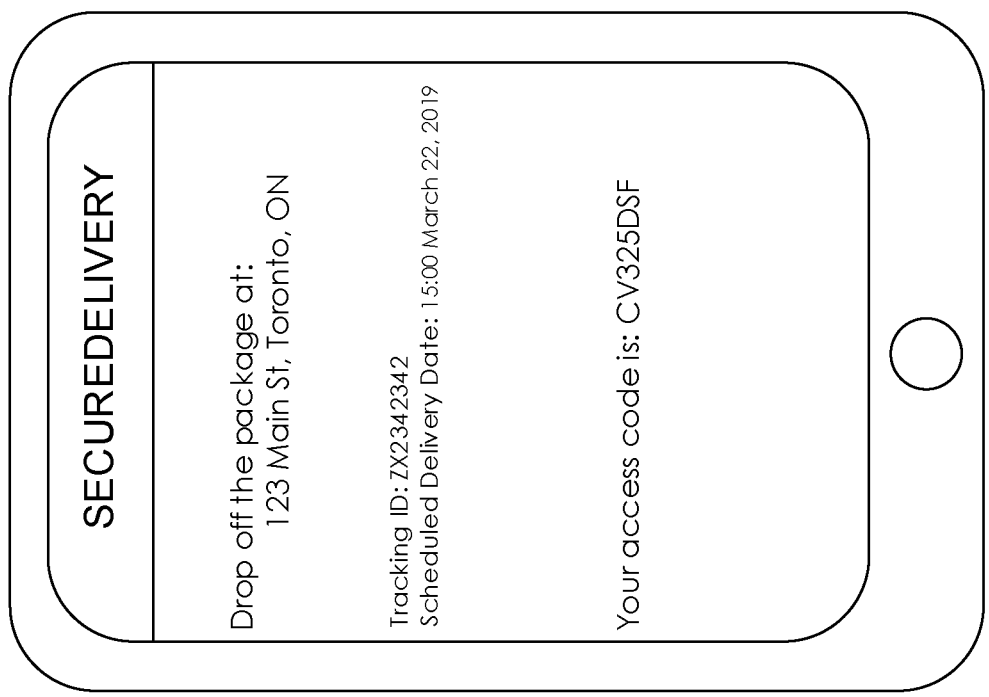
FIG. 8 illustrates an example delivery provider display in accordance with an example embodiment.

The delivery coordination system 110 may transmit a delivery provider notification to the delivery provider device 140. The delivery provider notification may be transmitted in various forms, e.g. an SMS message, e-mail, and/or notification within a local delivery application. An example delivery provider notification interface 800 is shown in FIG. 8 and described herein below. The delivery provider notification can include various information related to the delivery, such as the delivery provider authorization code and/or the delivery location.

The delivery provider authorization code may be provided in various formats. For example, the delivery provider authorization code may be provided as an alphanumeric code that can be entered input a keypad or other input device by a user of the delivery provider device 140. Alternately or in addition, the delivery provider authorization code may be provided in an electronically transmittable format. For example, the authorization code may be provided as a QR code or other electronically transmittable format. A user may then transmit the delivery provider authorization code to the storage processor 310 using an electronic input device at the package storage system 120 (e.g. an optical scanner or communication interface 330 for example). In some cases, the delivery authorization code may be provided as a biometric identifier, such as fingerprint, facial, or voice data.

At 420, the delivery coordination system 110 may transmit a first customer authorization code to a customer device 130 associated with the requesting user. As with the delivery provider code, the customer authorization code can be provided in various different formats (e.g. an alphanumeric code or electronically transmittable code). In some cases, the customer authorization code may be provided as a biometric identifier, such as fingerprint, facial, or voice data.

In some cases, the coordination processor 210 can be configured to evaluate a user's suitability for receiving the requested goods (e.g. required age, security level etc.) prior to providing the customer authorization code. The coordination processor can be configured to transmit the first customer authorization code to the customer device 130 associated with the requesting user only if the requesting user satisfies the goods requirement (e.g. a required age, security level etc.).

The coordination processor 210 may ensure that the requesting user has a suitable security level to receive the goods identified in the requested delivery. The security level may, in some cases, refer to restrictions on the goods (such as age requirements or requirements that the requesting user has a prescription). The coordination processor can be configured to determine that the requesting user satisfies the security level using stored user data corresponding to that user. The stored user data may be retrieved from a database stored in memory 220. Alternately or in addition, the stored user data may be received from the requesting user as part of the delivery request and/or in response to a request from coordination processor 210 for additional user data.

The coordination processor 210 may be configured to authenticate and/or validate the requesting user's security level with an external authority system, such as validation system 150. The coordination processor 210 can transmit user data associated with the requesting user to the external authority system 150. The coordination processor 210 can be configured to determine that the requesting user satisfies the security level in response to receiving a confirmation from the external authority system indicating that the requesting user satisfies the security level.

Figures 9, 10:
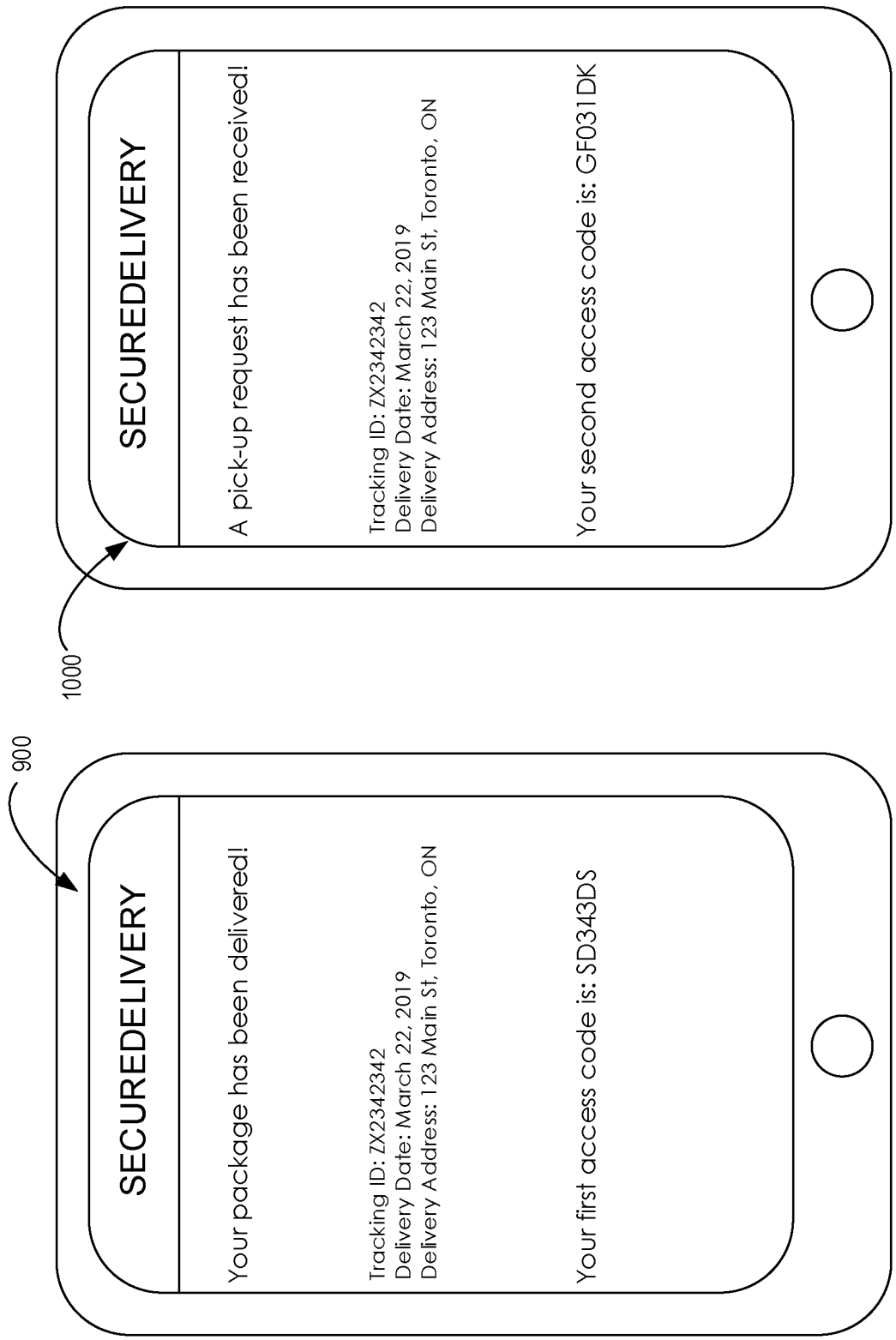
FIG. 9 illustrates an example delivery notification display in accordance with an example embodiment.
FIG. 10 illustrates an example collection request display in accordance with an example embodiment.

The delivery coordination system 110 may transmit a delivery notification to the customer device 130. The delivery notification may be transmitted in various forms, e.g. an SMS message, e-mail, and/or notification within a local delivery application. An example delivery notification interface 900 is shown in FIG. 9 and described herein below. The delivery notification can include various information related to the delivery, such as the first customer authorization code and/or the delivery location.

At 425, the package storage system 120 may receive a purported delivery provider authorization code. A delivery provider associated with the delivery provider device 140 may attempt to access the package storage system 120 by providing a delivery provider drop-off request. The delivery provider drop-off request may include a delivery identifier that indicates to the storage processor 210 the particular delivery that is being attempted. The delivery provider drop-off request can also specify a purported delivery provider authorization code. In some cases, the delivery provider authorization code may act as the delivery identifier.

The delivery provider may provide the purported delivery provider authorization code in various formats, e.g. as described herein above. For instance, the delivery provider may submit the purported delivery provider authorization code using a keypad or other input device of the package storage system 120. Alternately, the delivery provider device 140 can be configured to transmit, using a proprietary application on the delivery provider device 140, or otherwise display or provide the purported delivery provider authorization code. Alternatively, the package storage system 120 may be equipped with one or more biometric scanners configured to collect biometric information from the delivery provider, such as facial, voice, or fingerprint data.

At 430, the package storage system 120 can determine whether the purported delivery provider authorization code corresponds to the delivery provider authorization code. In some cases, the storage processor 310 can be configured to locally determine whether the purported delivery provider authorization code corresponds to the delivery provider authorization code. For example, the coordination processor 210 may transmit delivery provider authorization data usable by the storage processor 310 to determine whether the purported delivery provider authorization code corresponds to the delivery provider authorization code. Alternately, or in addition, the storage processor 310 can be configured to determine whether the purported delivery provider authorization code corresponds to the delivery provider authorization code through communication with the coordination processor 210.

The storage processor 310 can be configured to transmit the purported delivery provider authorization code to the coordination processor. The storage processor 310 can determine that the purported delivery provider authorization code corresponds to the delivery provider authorization code in response to receiving a confirmation message (from the coordination processor 210) indicating that the purported delivery provider authorization code corresponds to the delivery provider authorization code.

The coordination processor 210 can be configured to receive a purported delivery provider authorization code from the storage processor 310. The coordination processor 210 may then determine that the purported delivery provider authorization code corresponds to the delivery provider authorization code transmitted to the delivery provider device 140 at 415. In response to determining that the purported delivery provider authorization code corresponds to the delivery authorization code, the coordination processor 210 can transmit the confirmation to the storage processor 310 indicating that the purported delivery provider authorization code corresponds to the delivery provider authorization code. The confirmation may instruct the storage processor to permit access to the secure package container 340 by the preferred delivery provider. The storage processor 310 can thus allow the preferred delivery provider to store the at least one requested good in the secure package container 340.

At 435, the package storage system 120 can provide the delivery provider with access to the secure package container 340. The storage processor 310 can be configured to provide access to the secure package container 340 in response determining that the purported delivery provider authorization code corresponds to the delivery provider authorization code.

The storage processor 340 may also transmit a delivery notification alert to at least one of the coordination processor 210, the customer device 130, and the delivery provider device 140. The delivery notification alert can indicate that the requested goods have been delivered to the storage container 340. The delivery notification alert can be used to notify the requesting user that goods are available for retrieval from the storage container 340.

In some cases, the storage processor may transmit the delivery notification alert in response to determining that the purported delivery provider authorization code corresponds to the delivery authorization code. Alternately or in addition, the storage processor 310 can evaluate characteristics of the storage container 340 and/or received goods prior to transmitting the delivery notification alert. For example, the storage processor 310 may determine whether the characteristics of the received goods correspond to expected characteristics of the requested goods. The delivery notification alert may then specify whether or not the characteristics of the received goods are as expected/required. Optionally, the storage processor 310 can be configured to acquire validation data corresponding to the delivered goods. The validation data can provide evidence of whether or not the characteristics of the received goods are as expected/required.

In some cases, the delivery provider device 140 may be associated with an unmanned aerial vehicle or drone. The delivery provider may operate a drone to deliver goods to the storage container 340. The drone can be configured to transmit the purported delivery provider authorization code to the package storage system 120, e.g. through a wireless communication interface such as Bluetooth.

When the drone approaches the package storage system, the drone can establish communication with the storage processor using various technologies such as Bluetooth, NFC, WIFI, infrared, optical recognition, audio, magnetic and other technologies used for electronic identification. The drone can provide the purported delivery provider authorization code to the storage processor 310 once communication is established. The storage processor 310 can then authenticate the purported delivery provider authorization code as described above prior to providing the drone with access to the storage container 340.

The storage processor 310 can be configured to monitor the storage container 340 to determine when the drone delivery has completed. The storage processor 310 may then automatically close and secure the storage container 340 once it has determined that delivery has been completed.

At 440, the package storage system 120 can receive a purported first customer authorization code. The requesting user may attempt to access the package storage system 120 by providing a first customer pick-up request. The first customer pick-up request may be provided in response to the delivery notification alert. In some cases, the storage processor 310 and/or coordination processor 210 can be configured to determine that the customer pick-up request is invalid unless the delivery notification alert has already been transmitted.

The first customer pick-up request may include a delivery identifier that indicates to the storage processor 210 the particular delivery that the requesting user is attempting to retrieve. The first customer pick-up request can also specify a first purported customer authorization code. In some cases, the first purported customer authorization code may act as the delivery identifier.

The requesting user may provide the first purported customer authorization code in various formats, e.g. as described herein above. For instance, the requesting user may submit the first purported customer authorization code using a keypad or other input device of the package storage system 120. Alternately, the customer device 130 can be configured to transmit, using a proprietary application on the customer device 130, or otherwise display or provide the first purported customer authorization code. Alternatively, the package storage system 120 may be equipped with one or more biometric scanners configured to collect biometric information from the requesting user, such as facial, voice, or fingerprint data.

At 445, the delivery coordination system 110 can determine whether the purported first customer authorization code corresponds to the first customer authorization code. Determining whether the purported first customer authorization code corresponds to the first customer authorization code can be performed by the storage processor 310 and/or coordination processor 210 as described in respect of the purported delivery provider authorization code at step 430.

In general, the coordination processor 210 can be configured to determine that the purported first customer authorization code corresponds to the first customer authorization code. The coordination processor 210 may perform this determination directly (e.g. by receiving the purported first customer authorization code from the storage processor 310 and evaluating the purported first customer authorization code) or indirectly (e.g. by receiving an indication from the storage processor 310 that the purported first customer authorization code corresponds to the first customer authorization code.

At 450, the delivery coordination system 110 can transmit a second customer authorization code to the customer device 130 associated with the requesting user. The coordination processor 210 can be configured to transmit the second customer authorization code to the customer device 130 associated with the requesting user in response to determining that the purported first customer authorization code corresponds to the first customer authorization code. Alternately, the storage processor 310 may transmit the second customer authorization code to the customer device 130 associated with the requesting user.

In general, each authorization code can be different. That is, the first customer authorization code can be different from both the delivery provider authorization code and the second customer authorization code, and the delivery provider authorization code and second customer authorization code can be different from one another.

In some cases, the delivery coordination system 110 can be configured to authenticate the requesting user on the customer device 130 prior to providing the second customer authorization code. For instance, the delivery coordination system 110 may prompt the requesting user to provide authentication data (e.g. biometric data, a passcode) through an order delivery application operating on the customer device 130. This may help prevent unauthorized access to the storage container 340, even where the requesting user's customer device 130 has been lost or stolen.

The delivery coordination system 110 may transmit a collection request notification to the customer device 130. The collection request notification may be transmitted in various forms, e.g. an SMS message, e-mail, and/or notification within a local delivery application. An example collection request notification interface 1000 is shown in FIG. 10 and described herein below. The delivery notification can include various information related to the delivery, such as the second customer authorization code and/or the delivery location.

At 455, the package storage system 120 can receive a purported second customer authorization code. The requesting user may further attempt to access the package storage system 120 by providing a second customer pick-up request. The second customer pick-up request can be provided in respect of the same at least one requested good as the first customer pick-up request. In some cases, the storage processor 310 and/or coordination processor 210 can be configured to determine that the customer pick-up request is invalid unless the first customer pick-up request has already been provided and authenticated.

The second customer pick-up request can include a delivery identifier that indicates to the storage processor 210 the particular delivery that the requesting user is attempting to retrieve. The second customer pick-up request can also specify a second purported customer authorization code. In some cases, the second purported customer authorization code may act as the delivery identifier.

The requesting user may provide the second purported customer authorization code in various formats, e.g. as described herein above. For instance, the requesting user may submit the second purported customer authorization code using a keypad or other input device of the package storage system 120. Alternately, the customer device 130 can be configured to transmit, using a proprietary application on the customer device 130, or otherwise display or provide the second purported customer authorization code. Alternatively, the package storage system 120 may be equipped with biometric scanners configured to collect biometric information from the requesting user, such as facial, voice, or fingerprint data.

At 460, the package storage system 120 can determine whether the purported second customer authorization code corresponds to the second customer authorization code. Determining whether the purported second customer authorization code corresponds to the second customer authorization code can be performed by the storage processor 310 and/or coordination processor 210 as described in respect of the purported delivery provider authorization code at step 430 and the purported first customer authorization code at step 445.

The storage processor 310 can be configured to determine whether the purported second customer authorization code corresponds to the second customer authorization code. In some cases, the storage processor 310 may locally determine whether the purported second customer authorization code corresponds to the second customer authorization code. Alternately or in addition, the storage processor 310 can transmit the purported second customer authorization code to the coordination processor 210.

The coordination processor 210 can be configured to receive a purported second customer authorization code from the storage processor 310. The coordination processor 210 can be configured to determine that the purported second customer authorization code corresponds to the second customer authorization code. In response to determining that the purported second customer authorization code corresponds to the second customer authorization code, the coordination processor 210 can be configured to transmit a confirmation message to the storage processor 310 indicating that the purported second customer authorization code corresponds to the second customer authorization code. The confirmation message can instruct the storage processor 310 to permit access to the secure package container 340 by the requesting user. The storage processor 310 may then allow the requesting user to retrieve the at least one requested good stored in the secure package container.

At 465, the package storage system 120 can provide the user with access to the secure package container 340. The storage processor 310 can permit access to the secure package container 340 in response to determining at 460 that the purported second customer authorization code corresponds to the second customer authorization code.

In some cases, the storage processor 310 may be configured to determine a time limit for receiving the second customer pick-up request. For example, the time limit may be a specified period after receiving the first customer pick-up request or after transmitting the second customer authorization code. The storage processor 310 can be configured to determine that the second customer pick-up request was received within the time limit. The storage processor 310 may be configured to permit access to the secure package container 340 by the requesting user only in response to determining that the second customer pick-up request was received within the time limit. The storage processor 310 can be configured to other prevent access to the secure package container 340 by the requesting user. The time limit may thus define a limited validity period for the second customer authorization code.

In some cases, the storage processor 310 can be configured to monitor the secure package containers 340 on an ongoing basis. That is, the storage processor 310 can be configured to monitor the secure package containers 340 continually. In some cases, the monitoring of the secure package containers 340 may be initiated following delivery of goods by the delivery provider. Alternately or in addition, monitoring of the secure package containers 340 may be performed on a continuing and ongoing, regardless of whether goods are contained in the secure package container 340.

As noted above, the package storage system 120 can include at least one sensor 350. In some cases, the at least one sensor can include container sensors configured to monitor goods within a secure package container 340. The storage processor 310 can be configured to receive sensor data from the at least one sensor and determine from the sensor data that a trigger condition is satisfied. In response determining that the trigger condition is satisfied, the storage processor 310 can be configured to transmit an alert to at least one of: the coordination processor 210, the customer device 130, and the delivery provider device 134. In some cases, the storage processor 310 can be configured to transmit an alert to an external monitoring system (e.g. an alarm system).

In some examples, the trigger condition can include detecting access to the secure package container 340 subsequent to permitting the delivery provider to access to the secure package container 340. This may allow the storage processor 310 to transmit alerts related to potential unauthorized access to the goods housed in the secure package container 340.

In some examples, the trigger condition can include detecting access to the secure package container 340 subsequent to permitting the requesting user to access to the secure package container 340. This may allow the storage processor 310 to transmit alerts related to potential tampering with the package storage system 120.

In some examples, the trigger condition can include detecting an attempted access to the secure package container by a third party. This may allow the storage processor 310 to transmit alerts related to potential tampering with the package storage system 120 and/or unauthorized access to a secure package container 340 and any goods contained therein. Various examples of trigger conditions have also been described herein above.

The storage processor 310 and/or coordination processor 210 can be configured to store delivery data related to each delivery of goods. For instance, the delivery data can include identifying data related to each delivery provider and customer device used to access the secure container 340. Alternately or in addition, the delivery data can include access times representing the dates and/or times when the container was accessed by particular users. Additionally, sensor data (e.g. images, measurements etc.) may be included in the stored delivery data for each delivery. The delivery data may facilitate subsequent evaluation and/or auditing of each delivery.

Referring now to FIG. 5 shown therein is an example of a delivery initiation display 500 that may be displayed in accordance with an example embodiment. The delivery initiation display 500 may be provided by the order delivery platform and/or an external e-commerce platform associated with order delivery system 100.

A user can initiate a transaction through the delivery initiation display 500. As part of initiating the transaction, the consumer can be redirected to a secure delivery platform provided by the delivery coordination system 110. The secure delivery platform can be configured to obtain user data related to the requested delivery that can be used to initiate and coordinate the delivery of goods to the package storage system 120.

In some cases, the delivery coordination system 110 can be configured to validate the goods provider prior to initiating the delivery. If the goods provider is not validated, the delivery coordination system 110 can provide an error notification to the user. This may indicate that secure delivery is not available for the requested delivery. Alternately or in addition, this may indicate that the goods provider cannot provide (or is not expected to provide) one or more required goods characteristics. Alternately, if the goods provider is validated, the delivery coordination system 110 can redirect the user to a user registration interface.

Referring now to FIG. 6 shown therein is an example of a user registration display 600 that may be displayed in accordance with an example embodiment. The user registration display 600 can be configured to allow the user to provide user data required for the requested delivery.

Examples of user data can include the user's name, address, telephone number, age or date of birth, sex. In some cases, the user data may include verifiable identification such as a social insurance number, national identity number, driver's license number and so on.

In some cases, the user may be required to establish access credentials (e.g. a user ID and password) to access the order delivery platform. In some cases, the order delivery platform may be further secured using additional security verification measures, such as validation questions and/or two-factor authentication.

A user may be required to perform the registration process only once. For subsequent deliveries, the user may be able to by-pass the registration process by providing their access credentials (e.g. username and password). The delivery coordination system 110 may then retrieve the required user data from a database stored in memory 220

Once the delivery coordination system 110 has received the required user data (e.g. through registration and/or from memory 220), the user can be redirected to a delivery selection interface 700.

Referring now to FIG. 7 shown therein is an example of a delivery selection display 700 that may be displayed in accordance with an example embodiment. The delivery selection display 700 can allow the user to define a requested delivery location.

In some cases, the requested delivery location may specify a package storage system 120 directly. Alternately or in addition, the user may specify a desired delivery location. The delivery coordination system 110 may then select the package storage system 120 based on that desired delivery location (e.g. selecting a nearby package storage system 120).

In some cases, the user may select from various potential delivery providers to provide the secure delivery. The potential delivery providers may be displayed to the user through the delivery selection interface 700. The delivery coordination system 110 may identify suitable potential delivery providers based on the requested delivery location and/or required security level of the goods in the requested delivery. The user may then select one of the potential delivery providers. Alternately, the delivery coordination system 110 may be configured to automatically select the preferred delivery provider from the suitable potential delivery providers. Once the preferred delivery provider is identified, the delivery coordination system 110 can transmit a delivery provider notification to the delivery provider device 140 associated with the preferred delivery provider.

Referring now to FIG. 8 shown therein is an example of a delivery provider display 800 that may be displayed in accordance with an example embodiment. The delivery provider display 800 illustrates a delivery provider notification displayed on the delivery provider device 140 through a local delivery application. As shown in FIG. 8, the delivery provider notification includes various information related to the delivery, such as a delivery identifier (Tracking ID), delivery provider authorization code (access code), delivery location and scheduled delivery date.

Referring now to FIG. 9 shown therein is an example of a delivery notification display 900 that may be displayed in accordance with an example embodiment. The delivery notification display 900 illustrates a delivery notification displayed on the customer device 130 through a local delivery application. As shown in FIG. 9, the delivery notification can include various information related to the delivery, such as the delivery identifier (Tracking ID), first customer authorization code (first access code), delivery location, and delivery date. The delivery notification can be used by the requesting user to initiate a collection request at the package storage system 120.

Referring now to FIG. 10 shown therein is an example of a collection request display 1000 that may be displayed in accordance with an example embodiment. The collection request display 1000 illustrates a collection request notification displayed on the customer device 130 through a local delivery application. As shown in FIG. 10, the collection request notification can include various information related to the delivery, such as the delivery identifier (Tracking ID), second customer authorization code (first access code), delivery location, and delivery date. The collection request notification can be used by the requesting user to access the secure package container housing the delivered goods.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

We claim:

1. A system for coordinating secure delivery of goods, the system comprising:
 a storage processor in communication with a package storage system, wherein the package storage system comprises a secure package container, and goods are receivable within the secure package container;
 a coordination processor in communication with the storage processor and a database, wherein the database is configured to store delivery provider data and storage system data, the delivery provider data identifying a plurality of potential delivery providers, and the storage system data identifying a plurality of potential package storage systems, and wherein the coordination processor is located remotely from the storage processor;
 wherein the coordination processor is configured to:
 receive a delivery request specifying at least one requested good for secure delivery and specifying a requesting user;
 determine, based on the delivery request, a preferred delivery provider for delivering the at least one requested good from amongst the plurality of potential delivery providers;
 determine, based on the delivery request, that the package storage system is a preferred package storage system for storing the at least one requested good from amongst the plurality of potential package storage systems;

transmit a delivery provider authorization code to a delivery provider device associated with the preferred delivery provider; and transmit a first customer authorization code to a customer device associated with the requesting user;

wherein the storage processor is configured to:
receive a delivery provider drop-off request for the at least one requested good specifying a purported delivery provider authorization code;
determine that the purported delivery provider authorization code corresponds to the delivery provider authorization code;
in response to determining that the purported delivery provider authorization code corresponds to the delivery provider authorization code, permit access to the secure package container thereby allowing the preferred delivery provider to store the at least one requested good in the secure package container; and
receive a first customer pick-up request for the at least one requested good specifying a purported first customer authorization code;

wherein the coordination processor is further configured to:
determine that the purported first customer authorization code corresponds to the first customer authorization code;
in response to determining that the purported first customer authorization code corresponds to the first customer authorization code, transmit a second customer authorization code to the customer device associated with the requesting user;

wherein the storage processor is further configured to:
receive a second customer pick-up request for the same at least one requested good specifying a purported second customer authorization code;
determine that the purported second customer authorization code corresponds to the second customer authorization code; and
in response to determining that the purported second customer authorization code corresponds to the second customer authorization code, permit access to the secure package container by the requesting user thereby allowing the requesting user to retrieve the at least one requested good stored in the secure package container.

2. The system of claim 1, wherein:
the storage processor is configured to determine that the purported delivery provider authorization code corresponds to the delivery provider authorization code by:
transmitting the purported delivery provider authorization code to the coordination processor; and
receiving a confirmation message indicating that the purported delivery provider authorization code corresponds to the delivery provider authorization code; and
the coordination processor is configured to:
determine that the purported delivery provider authorization code corresponds to the delivery provider authorization code; and
transmit the confirmation to the storage processor indicating that the purported delivery provider authorization code corresponds to the delivery provider authorization code.

3. The system of claim 1, wherein the first customer authorization code is different from both the delivery provider authorization code and the second customer authorization code.

4. The system of claim 1, wherein the storage processor is configured to:
determine a time limit for receiving the second customer pick-up request;
determine that the second customer pick-up request was received within the time limit;
permit access to the secure package container by the requesting user only in response to determining that the second customer pick-up request was received within the time limit.

5. The system of claim 1, wherein the storage processor is configured to:
in response to determining that the purported delivery provider authorization code corresponds to the delivery authorization code, transmit a delivery notification alert to at least one of the coordination processor, the customer device, and the delivery provider device.

6. The system of claim 1, wherein:
the package storage system further comprises at least one sensor configured to monitor goods stored within the secure package container; and
the storage processor is further configured to:
receive sensor data from the at least one sensor;
determine from the sensor data that a trigger condition is satisfied; and
in response determining that the trigger condition is satisfied, transmit an alert to at least one of: the coordination processor, the customer device, and the delivery provider device.

7. The system of claim 6, wherein the trigger condition comprises detecting access to the secure package container subsequent to permitting access to the secure package container in response to determining that the purported delivery provider authorization code corresponds to the delivery provider authorization code.

8. The system of claim 6, wherein the trigger condition comprises detecting access to the secure package container subsequent to permitting access to the secure package container by the requesting user.

9. The system of claim 6, wherein:
the at least one sensor comprises a weight sensor; and
the trigger condition comprises determining that a weight of received goods within the secure package container differs from an expected weight of the at least one requested good.

10. The system of claim 6, wherein:
the at least one sensor comprises a dimension sensor; and
the trigger condition comprises determining that a dimension of the received goods within the secure package container differs from an expected dimension of the at least one requested good.

11. A method for coordinating secure delivery of goods, the method comprising:
operating a coordination processor to:
receive a delivery request specifying at least one requested good for secure delivery and specifying a requesting user;
determine, based on the delivery request, a preferred delivery provider for delivering the at least one requested good, from amongst a plurality of potential delivery providers identified by delivery provider data stored in a database in communication with the coordination processor;

determine, based on the delivery request, a preferred package storage system for storing the at least one requested good from amongst a plurality of potential package storage systems identified by storage system data stored at the database, wherein the preferred package storage system comprises a secure package container, and goods are receivable within the secure package container;

transmit a delivery provider authorization code to a delivery provider device associated with the preferred delivery provider; and transmit a first customer authorization code to a customer device associated with the requesting user;

operating a storage processor in communication with the preferred package storage system to:

receive a delivery provider drop-off request for the at least one requested good specifying a purported delivery provider authorization code;

determine that the purported delivery provider authorization code corresponds to the delivery provider authorization code;

in response to determining that the purported delivery provider authorization code corresponds to the delivery provider authorization code, permit access to the secure package container by the preferred delivery provider thereby allowing the preferred delivery provider to store the at least one requested good in the secure package container;

receive a first customer pick-up request for the at least one requested good specifying a purported first customer authorization code; and further operating the coordination processor to:

determine that the first purported customer authorization code corresponds to the first customer authorization code;

in response to determining that the purported first customer authorization code corresponds to the first customer authorization code, transmit a second customer authorization code to the customer device associated with the requesting user;

further operating the storage processor to:

receive a second customer pick-up request for the same at least one requested good specifying a purported second customer authorization code;

determine that the purported second customer authorization code corresponds to the second customer authorization code; and in response to determining that the purported second customer authorization code corresponds to the second customer authorization code, permit access to the secure package container by the requesting user thereby allowing the requesting user to retrieve the at least one requested good stored in the secure package container.

12. The method of claim 11, wherein:

the purported delivery provider authorization code is determined to correspond to the delivery provider authorization code by:

transmitting the purported delivery provider authorization code to the coordination processor; and receiving a confirmation message indicating that the purported delivery provider authorization code corresponds to the delivery provider authorization code; and the method further comprises operating the coordination processor to:

determine that the purported delivery provider authorization code corresponds to the delivery provider authorization code; and transmit the confirmation to the storage processor indicating that the purported delivery provider authorization code matches the delivery provider authorization code.

13. The method of claim 11, wherein the first customer authorization code is different from both the delivery provider authorization code and the second customer authorization code.

14. The method of claim 11, further comprising operating the storage processor to:

determine a time limit for receiving the second customer pick-up request;

determine that the second customer pick-up request was received within the time limit;

permit access to the secure package container by the requesting user only in response to determining that the second customer pick-up request was received within the time limit.

15. The method of claim 11, further comprising:

operating the storage processor to, in response to determining that the purported delivery provider authorization code corresponds to the delivery authorization code, transmit a delivery notification alert to at least one of the coordination processor, the customer, and the delivery provider device.

16. The method of claim 11, further comprising:

operating the storage processor to:

receive sensor data from at least one sensor configured to monitor goods stored within the package storage container;

determine from the sensor data, that a trigger condition is satisfied; and in response to determining that the trigger condition is satisfied, transmit an alert to at least one of: the delivery coordination system, the customer device, and the delivery provider device.

17. The method of claim 16, wherein the trigger condition comprises detecting access to the secure package subsequent to permitting access to the secure package container in response to determining that the purported delivery provider authorization code corresponds to the delivery provider authorization code.

18. The method of claim 16, wherein the trigger condition comprises detecting access to the secure package container subsequent to permitting access to the secure package container by the requesting user.

19. The method of claim 16, wherein:

the trigger condition comprises determining that a weight of received goods within the secure package container differs from an expected weight of the at least one requested good.

20. The method of claim 16, wherein:

the trigger condition comprises determining that a dimension of received goods within the secure package container differs from an expected dimension of the at least one requested good.

* * * * *